(12) United States Patent
Baumberg

(10) Patent No.: US 7,006,089 B2
(45) Date of Patent: Feb. 28, 2006

(54) METHOD AND APPARATUS FOR GENERATING CONFIDENCE DATA

(75) Inventor: Adam Michael Baumberg, Berkshire (GB)

(73) Assignee: Canon Kabushiki Kaisha, Tokyo (JP)

(*) Notice: Subject to any disclaimer, the term of this patent is extended or adjusted under 35 U.S.C. 154(b) by 195 days.

(21) Appl. No.: 10/150,840

(22) Filed: May 20, 2002

(65) Prior Publication Data

US 2003/0001837 A1  Jan. 2, 2003

(30) Foreign Application Priority Data

May 18, 2001 (GB) .................................. 0112203

(51) Int. Cl.
*G06T 17/00* (2006.01)

(52) U.S. Cl. ...................................................... 345/420

(58) Field of Classification Search ................ 345/420, 345/421, 422, 426, 589, 629
See application file for complete search history.

(56) References Cited

U.S. PATENT DOCUMENTS

| 6,084,979 A | 7/2000 | Kanade et al. ............... 382/154 |
| 6,204,859 B1 * | 3/2001 | Jouppi et al. ............... 345/592 |
| 6,700,584 B1 * | 3/2004 | Wood .......................... 345/581 |
| 2001/0056308 A1 | 12/2001 | Petrov et al. .................. 700/98 |
| 2002/0050988 A1 | 5/2002 | Petrov et al. ............... 345/418 |

FOREIGN PATENT DOCUMENTS

| GB | 2357949 A | 7/2001 |
| GB | 2 362 793 A | 11/2001 |
| GB | 2 369 541 A | 5/2002 |
| JP | 6-259571 | 9/1994 |
| JP | 6-348860 A | 12/1994 |
| JP | 7-230555 | 8/1995 |
| JP | 7-254072 A | 10/1995 |
| JP | 8-147494 A | 6/1996 |
| JP | 9-161100 | 6/1997 |
| JP | 11-120372 A | 4/1999 |
| JP | 2000-137815 A | 5/1999 |
| JP | 2000-348196 | 12/2000 |
| JP | 2001-126084 | 5/2001 |

OTHER PUBLICATIONS

Carpenter, The A-buffer, an Antialiased Hidden Surface Method, ACM, 1984, pp. 103-108.*
Watt et al., Advanced Animation and Rendering Techniques, 1992. pp. 127-132.*
Wolfgang Niem et al., "Automatic Reconstruction of 3D Objects Using a Mobile Monoscopic Camera." Image and Vision Computing 17, pp. 125-134. (1999).
Peter J. Burt et al., "A Multiresolution Spline with Application to Image Mosaics." ACM Transactions on Graphics (TOG), vol. 2, No. 4, pp. 217-236 (Oct. 1983).

(Continued)

*Primary Examiner*—Almis R. Jankus
(74) *Attorney, Agent, or Firm*—Fitzpatrick, Cella, Harper & Scinto

(57) ABSTRACT

An image processing apparatus (2) is disclosed in which input images are processed to generate texture map data for texture rendering a generated three-dimensional computer model of object(s) appearing in the images. In order to select the portions of the images utilized, confidence data is generated indicative of the extent portions of the surface of a model are visible in each of the images. The images are then combined utilizing this confidence data, where image data representative of different spatial frequencies are blended in different ways utilizing the confidence data.

26 Claims, 14 Drawing Sheets

OTHER PUBLICATIONS

Paul E. Debevec et al., "Modeling and Rendering Architecture from Photographs: A Hybrid Geometry and Image-Based Approach." In Conference Proceedings ACM Siggraph, pp. 11-20 (1996).

Frédéric Pighin et al., "Synthesizing Realistic Facial Expressions from Photographs." Proceedings of the 25th Annual Conference on Computer Graphics, pp. 1-9 (Jul. 1998).

Fausto Bernardini et al., "High-Quality Texture Reconstruction from Multiple Scans." IEEE Transactions on Visualization and Computer Graphics, vol. 7, No. 4, pp. 318-332 (Oct.-Dec. 2001).

Eyal Ofek et al., "Multiresolution Textures from Image Sequences." IEEE Computer Graphics and Applications, vol. 17, No. 2, pp. 18-29 (Mar. 1997).

Igor Guskov et al., "Multiresolution Signal Processing for Meshes." In Conference Proceedings ACM Siggraph, pp. 325-334 (1999).

Matthias Eck et al., "Multiresolution Analysis of Arbitrary Meshes." In Conference Proceedings ACM Siggraph, pp. 173-182 (1995).

Pedro V. Sander et al., "Texture Mapping Progressive Meshes." In Conference Proceedings ACM Siggraph, pp. 409-423 (Aug. 2001).

Makoto Maruya, "Texture Map Generation from Object-Surface Data." Computer Graphics Forum, vol. 14, No. 3, pp. 397-405 (1995).

Maneesh Agrawala et al., "Efficient Image-Based Methods for Rendering Soft Shadows." Proceedings of Siggraph 2000, Computer Graphics Proceedings, Annual Conference Series, pp. 375-384 (Jul. 2000).

Yizhou Yu., "Efficient Visibility Processing for Projective Texture Mapping." Computer & Graphics, vol. 23, pp. 245-253 (1999).

Reinhard Koch et al., "Multi Viewpoint Stereo from Uncalibrated Video Sequences." ECCV '98, vol. I, pp. 55-71 (Jun. 1998).

C. Rocchini et al., "Multiple Textures Stitching and Blending on 3D Objects." Eurographics Rendering Workshop, (Jun. 1999).

Hendrik P. A. Lensch, "A Silhouette-Based Algorithm for Texture Registration and Stitching." Graphical Models, vol. 63, No. 4, pp. 245-262 (2001).

Wojciech Matusik et al., "Image-Based Visual Hulls." Proceedings of SIGGRAPH 2000, pp. 369-374 (2000).

Dan Piponi et al., "Seamless Texture Mapping of Subdivision Surfaces by Model Pelting and Texture Blending." Proceeding of SIGGRAPH 2000, pp. 471-478 (Jul. 2000).

* cited by examiner

METHOD AND APPARATUS FOR GENERATING CONFIDENCE DATA

The present invention concerns method and apparatus for generating confidence data. In particular the present invention concerns method and apparatus for generating data indicative of the reliability of image data from specified viewpoints of an object to be modelled for generating texture data for portions of the model of an object appearing in the image.

When a large number of images of an object from different viewpoints are available, this provides a large amount of information about the appearance of the surface of an object. Texture data for texture rendering a model of an object appearing in images can then be generated from the images.

However, as for any three-dimensional object not all of the surface of any object will be visible in any particular view, it is necessary to combine image data from different images to generate texture rendering data. A means for determining which images are utilised for generating which portions of texture render data is therefore required.

In accordance with one aspect of the present invention there is provided a method of generating reliability data indicative of the reliability of portions of an image of an object from a first viewpoint for generating image data for a computer model of said object appearing in said image viewed from a second viewpoint comprising the steps of:

generating an image of a said object viewed from a first viewpoint rendered utilizing data representative of the reliability of utilizing portions of an image of an object from said first viewpoint for generating data representative of the surface of said object; and generating reliability data for said object as viewed from a second viewpoint utilizing said generated image to generate reliability data for portions of a said object visible from both said first and second viewpoints and default data indicative of low reliability for the remainder of the surface of said object visible from said second viewpoint.

Further aspects and embodiments of the present invention will become apparent with reference to the following description and drawings in which.

A first embodiment of will now be described in which a number of generated projected images corresponding to the same viewpoints are combined to generate composite texture map data for texture rendering a 3D computer model of object(s) appearing in the images. In the embodiment projected images corresponding to the same view points are combined utilizing generated weight function data indicative of the relative reliability of corresponding portions of the projected images.

First Embodiment

Figure 1:
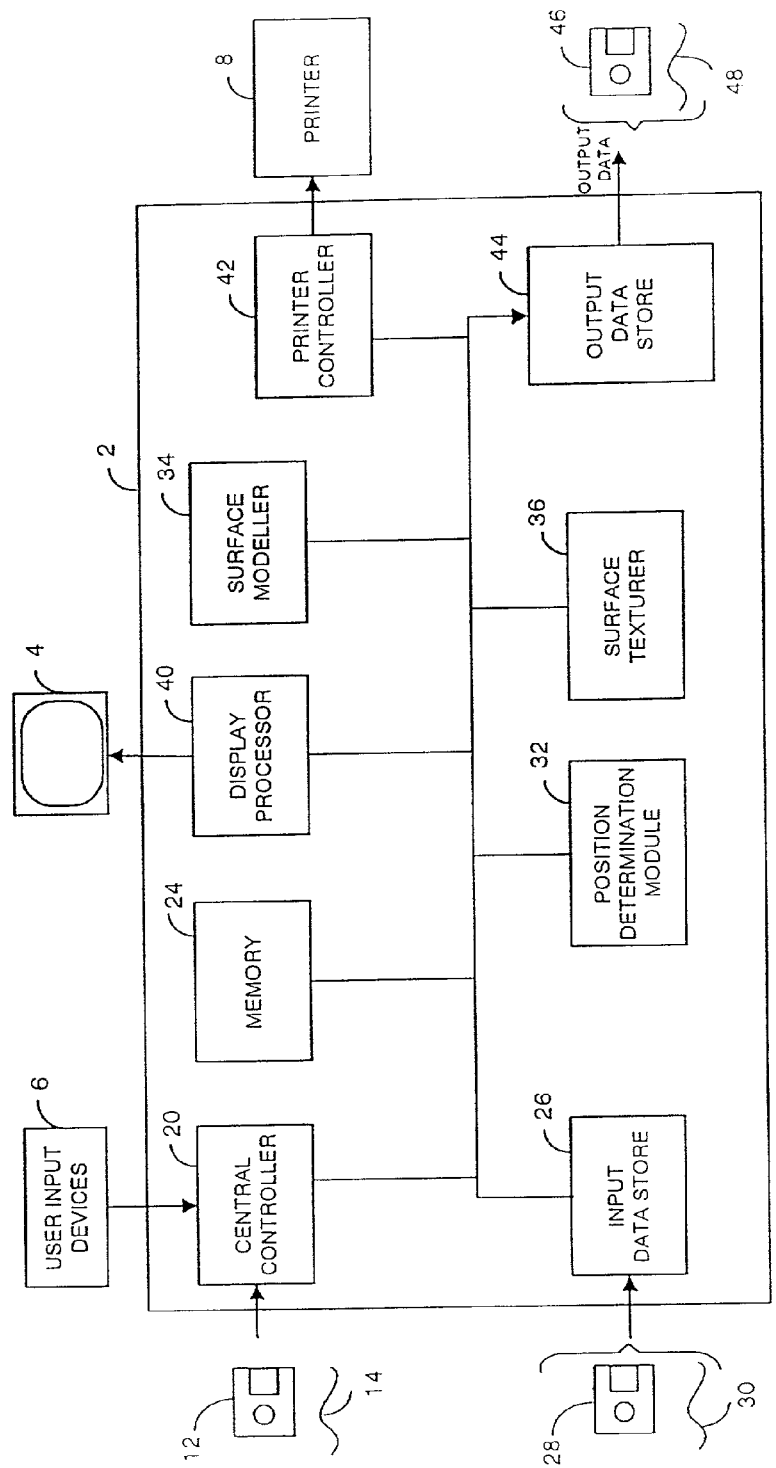
FIG. 1 is a schematic block diagram of a first embodiment of the present invention.

Referring to FIG. 1, an embodiment of the invention comprises a processing apparatus 2, such as a personal computer, containing, in a conventional manner, one or more processors, memories, graphics cards etc., together with a display device 4, such as a conventional personal computer monitor, user input devices 6, such as a keyboard, mouse etc. and a printer 8.

The processing apparatus 2 is programmed to operate in accordance with programming instructions input, for example, as data stored on a data storage medium, such as disk 12, and/or as a signal 14 input to the processing apparatus 2, for example from a remote database, by transmission over a communication network (not shown) such as the Internet or by transmission through the atmosphere, and/or entered by a user via a user input device 6 such as a keyboard.

As will be described in more detail below, the programming instructions comprise instructions to cause the processing apparatus 2 to become configured to process input data defining a plurality of images of a subject object recorded from different view points. The input data then is processed to generate data identifying the positions and orientations at which the input images were recorded. These calculated positions and orientations and the image data are then used to generate data defining a three-dimensional computer model of the subject object.

When programmed by the programming instructions, processing apparatus 2 effectively becomes configured into a number of functional units for performing processing operations. Examples of such functional units and their interconnections are shown in FIG. 1. The units and interconnections illustrated in FIG. 1 are, however, notional and are shown for illustration purposes only to assist understanding; they do not necessarily represent the exact units and connections into which the processor, memory etc. of the processing apparatus 2 become configured.

Referring to the functional units shown in FIG. 1, a central controller 20 processes inputs from the user input devices 6, and also provides control and processing for the other functional units. Memory 24 is provided for use by central controller 20 and the other functional units.

Input data store 26 stores input data input to the processing apparatus 2 for example as data stored on a storage device, such as disk 28, as a signal 30 transmitted to the processing apparatus 2, or using a user input device 6. The input data defines a plurality of colour images of one or more objects recorded at different positions and orientations. In addition, in this embodiment, the input data also includes data defining the intrinsic parameters of the camera which recorded the images, that is, the aspect ratio, focal length, principal point (the point at which the optical axis intersects the imaging plane), first order radial distortion coefficient, and skew angle (the angle between the axes on the pixel grid; because the axes may not be exactly orthogonal).

The input data defining the input images may be generated for example by downloading pixel data from a digital camera which recorded the images, or by scanning photographs using a scanner (not shown). The input data defining the intrinsic camera parameters may be input by a user using a user input device 6.

Position determination module 32 processes the input images received by the input data store 26 to determine the relative positions and orientations of camera view points from which image data of an object represented by the image data have been obtained. In this embodiment, this is achieved in a conventional manner by identifying and matching features present in the input images and calculating relative positions of camera views utilising these matches.

Surface modeller 34 processes the data defining the input images and the data defining the positions and orientations at which the images were recorded to generate data defining a 3D computer wire mesh model representing the actual surface(s) of the object(s) in the images. In this embodiment this 3D model defines a plurality of triangles representing the surface of the subject object modelled.

Surface texturer 36 generates texture data from the input image data for rendering onto the surface model produced by surface modeller 34. In particular, in this embodiment the surface texturer 36 processes the input image data and the data defining the positions and orientations at which the images were recorded to generate six texture maps comprising six views of a subject object as viewed from a box bounding the subject object. These generated texture maps are then utilized to texture render the surface model so that images of a modelled subject object from any viewpoint may be generated.

As part of generation of the texture maps, the surface texturer 36 initially determines weight function data indicative of the relative reliability of different input images for generating texture maps for texture rendering different portions of a modelled object. The processing of the surface texturer 36 to generate this weight function data and the subsequent generation of texture maps from the input image data will be described in detail later.

Display processor 40, under the control of central controller 20, displays instructions to a user via display device 4. In addition, under the control of central controller 20, display processor 40 also displays images of the 3D computer model of the object from a user-selected viewpoint by processing the surface model data generated by surface modeller 34 and rendering texture data produced by surface texturer 36 onto the surface model.

Printer controller 42, under the control of central controller 30 causes hard copies of images of the 3D computer model of the object selected and displayed on the display device 4 to be printed by the printer 8.

Output data store 44 stores the surface model and texture data therefor generated by surface modeller 34 and surface texturer 36. Central controller 20 controls the output of data from output data store 44, for example as data on a storage device, such as disk 46, or as a signal 48.

An outline of the processing of the surface texturer 36 for generating texture data for rendering onto a surface model produced by the surface modeller 34 will now be described. The structure and processing of the surface texturer 36 will then be described in detail.

Outline of Processing to Generate Canonical Texture Maps

When a plurality of images of a subject object recorded from different viewpoints are available, this provides a large amount of data about the outward appearance of the subject object. Where images are recorded from different viewpoints, these images provide varying amounts of data for the different portions of the subject object as those portions are visible to a lesser or greater amount within the images. In order to create a model of the appearance of an object, it is necessary to process these images to generate texture data so that a consistent texture model of a subject object can be created.

In this embodiment this is achieved by the surface texturer 36 which processes the input image data of a subject object recorded from different viewpoints in order to generate texture data for rendering the surface model produced by the surface modeller 34. In this embodiment this texture data comprises six texture maps, the six texture maps comprising views of subject object from the six faces of a cuboid centred on the subject object.

Figure 2:
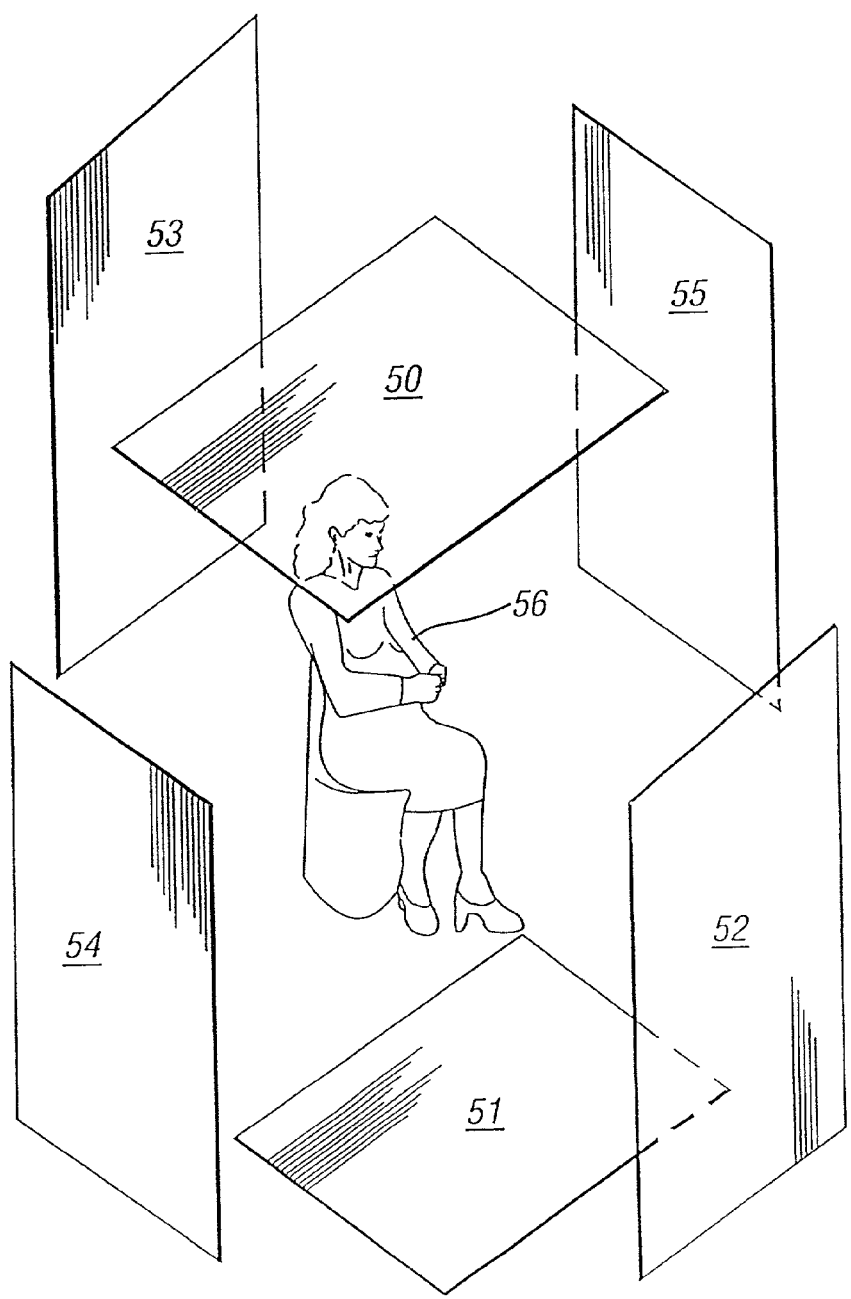
FIG. 2 is an exemplary illustration of the position and orientation of six texture maps bounding an exemplary subject object.

FIG. 2 is an exemplary illustration of the position and orientation of six texture maps 50–55 bounding an exemplary subject object 56. In this embodiment the six texture maps comprise texture maps for six canonical views of an object being views of the object from the top 50, bottom 51, front 52, back 53, left 54 and right 55.

The six canonical views 50–55 comprise three pairs 50,51;52,53;54,55 of parallel image planes, centred on the origin of the coordinate system of the model, with each of the three pairs of image planes aligned along one of the three coordinate axes of the coordinate system respectively. The relative positions of the viewpoints of the canonical views 50–55 are then selected so that relative to the size of the model 56 of the subject object created by the surface modeller 34, the distance away from the object is selected so that the canonical views are equally spaced from the centre of the object and the extent of an object as viewed from each image plane is no more than an threshold number of pixels in extent. In this embodiment this threshold is set to be 512 pixels. Each of the texture maps for the model is then defined by a weak perspective projection of the subject object 56 onto the defined image planes.

After image data for each of the six canonical views 50–55 has been determined, image data of the model 56 of the subject object from any viewpoint can then be generated using conventional texture rendering techniques, where texture rendering data for each portion of the surface of the model 56 is generated utilizing selected portions of the canonical views 50–56.

By generating texture data for a model of a subject object in this way the total number of required texture maps is limited to the six canonical views 50–56. Furthermore, since each of the canonical views corresponds to a view of the projection of a real world object the canonical views 50–55 should be representative of realistic views of the subject object and hence be suited for compression by standard image compression algorithms such as JPEG which are optimised for compressing real world images.

As generated images of a model of a subject object may obtain texture rendering data from any of the six canonical texture maps, it is necessary to generate all of the texture maps in such a way that they are all consistent with one another. Thus in this way where different portions of an image of a subject object are rendered utilizing texture maps from different views no noticeable boundaries arise. As for any 3D object not all of the surface of a subject object from all six canonical views 50–55 will be visible in any single input image, it is necessary for the surface texture 36 to combine image data from the plurality of images available to generate texture maps for these six consistent views 50–55.

Prior to describing in detail the processing by the surface texturer 36 which enables a set of six consistent texture maps to be generated from the available input images, the structure of the surface texturer 36 in terms of notional functional processing units will now be described.

Structure of Surface Texturer

Figure 3:
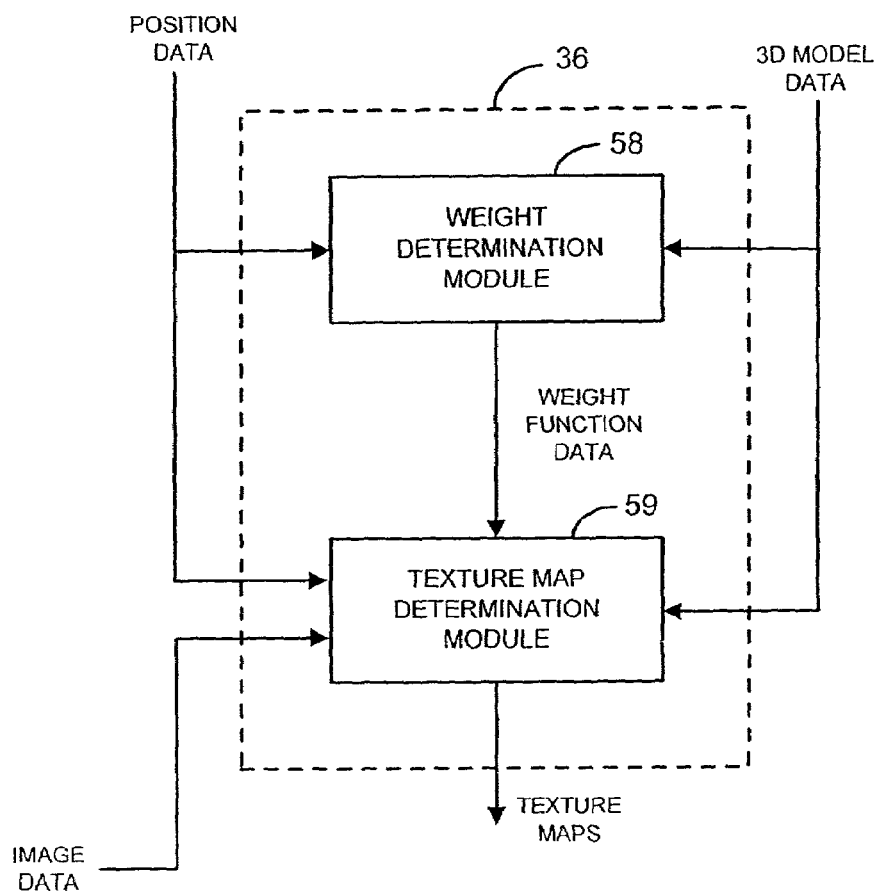
FIG. 3 is a schematic block diagram of the surface texturer of FIG. 1.

FIG. 3 is a schematic block diagram of the surface texturer 36 in accordance with this embodiment of the present invention. In this embodiment, the surface texturer 36 comprises a weight determination module 58 and a texture map determination module 59.

In order to select portions of available image data to be utilized to generate the six canonical texture maps 50–55 the surface texturer 36 utilizes position data generated by the position determination module 32 identifying the viewpoints in which data has been obtained and 3D model data output by the surface modeler 34. This position data and 3D model data is processed by the weight determination module 58 to generate weight function data identifying a relative preference for utilizing input images from an identified view point for generating texture data for each portion of the surface of the model of the subject object.

This weight function data is then passed to the texture map determination module 59 which processes the weight function data together with the position data generated by the position determination module 32, the model data generated by the surface modeller 34 and the available image data stored within the input data store 26 to generate a set of six consistent texture maps for the canonical views 50–55.

Generation of Weight Function Data

The processing of the weight determination module 58 to generate weight function data indicative of relative preferences for utilizing different input images for generating texture data for different portions of a model of a subject object will now be described in detail.

In this embodiment the weight function data is utilised to blend image data from different images of a subject object so that consistent texture maps for six canonical views 50–55 can be generated. To achieve this, weight function data is generated by the weight determination module 58 for the entire surface of a model of a subject object for each of the positions identified by the position data generated by the position determination module 32.

In order for the images of a subject object stored in the input data store 26 to be smoothly blended to generate texture maps in which no discernible boundaries arise within the texture maps it is necessary for the weight function data for each viewpoint to vary smoothly across the surface of a model of a subject object. Furthermore, so that only image data representative of visible portions of a subject object is utilised to generate texture render data for a corresponding visible portion of the subject object as seen from a canonical view, it is necessary for the weight function data to define a function that falls to a level indicative of low reliability for parts of a surface of a subject object that are hidden or nearly hidden in a particular input image.

Figure 4:
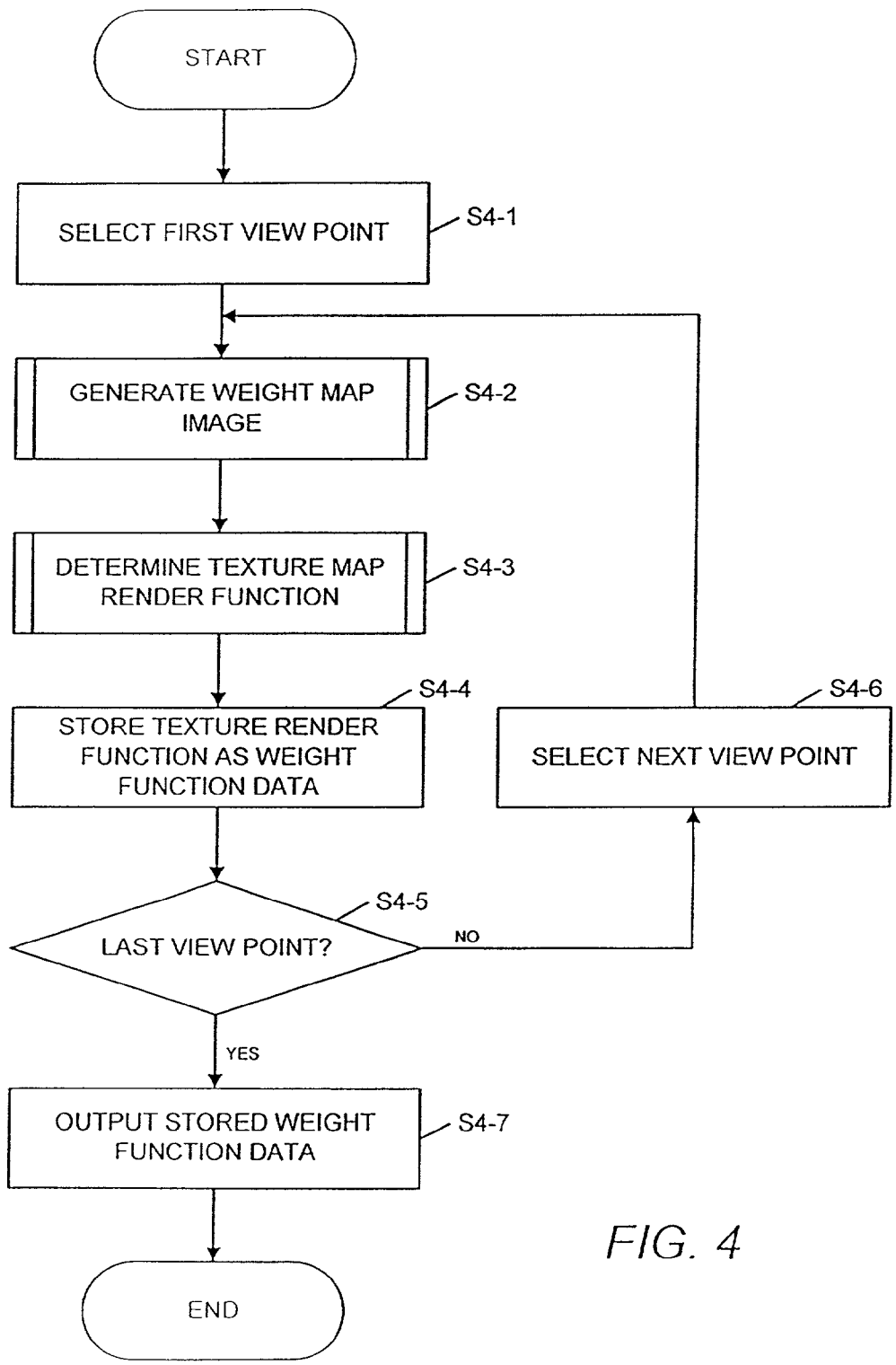
FIG. 4 is a flow diagram of the processing of the weight determination module of the surf ace texturer of FIG. 3.

FIG. 4 is a flow diagram of the processing of the weight determination module 58.

Initially, the weight determination module 58 selects (S4-1) a first view point from the set of view points identified by position data output by the position determination module 32.

After a particular viewpoint has been selected, the weight determination module 58 then (S4-2) calculates a weight map image for the selected viewpoint representative of the relative preference for utilising data from an input image from the currently selected viewpoint for texture rendering the corresponding portion of a subject object visible in that image.

In this embodiment, as will be described in detail later, this weight map image is generated so that values in the weight map image vary smoothly across the visible surface of a model of a subject object and falls to zero for all parts of a subject object adjacent to portions not visible in the selected view. In this way the weight map image is then suitable to be utilized to generate weight function data for a viewpoint as will be described in detail later.

After a weight map image has been generated by the weight determination module 58, the weight determination module 58 then (S4-3) calculates weight function data for the selected view in the form of a texture map render function, generated utilizing the calculated weight map image. This texture map render function comprises data which varies smoothly across the surface of a model of a subject object and which is indicative of a low reliability for all portions of the surface of a subject object which are not visible in the selected view. This texture map render function is then (S4-4) stored as part of the weight function data to be output by the weight determination module and utilised by the texture map determination module 59.

The weight determination module 58 then (S4-5) determines whether the viewpoint for which weight function data has been stored is the last viewpoint for which a texture map render function is to be generated and stored. If this is not the case the weight determination module 58 then (S4-6) proceeds to select the next viewpoint identified position data output by the position determination module 32 and generates a weight map image for the viewpoint (S4-2) before determining and storing a further texture map render function as weight function data for that viewpoint (S4-3–S4-4). The weight determination module 58 then checks (S4-5) once again whether the viewpoint for which weight function data has been stored corresponds to the final viewpoint identified by the position data output by the position determination module 32.

Finally, when the weight determination module 58 determines that texture map render functions have been stored for each of the viewpoints identified by position data output by the position determination module 32, these texture render functions are output (S4-7) as a weight function data by the weight determination module 58 for use by the texture map determination module 59.

The processing of the weight determination module 58 in order to generate a weight map image for a selected viewpoint (S4-2) and for determining a texture map render function (S4-3) for a particular viewpoint will now be described in detail with reference to FIGS. 5, 6A and 6B, 7A, 7B, 8 and 9.

Figure 5:
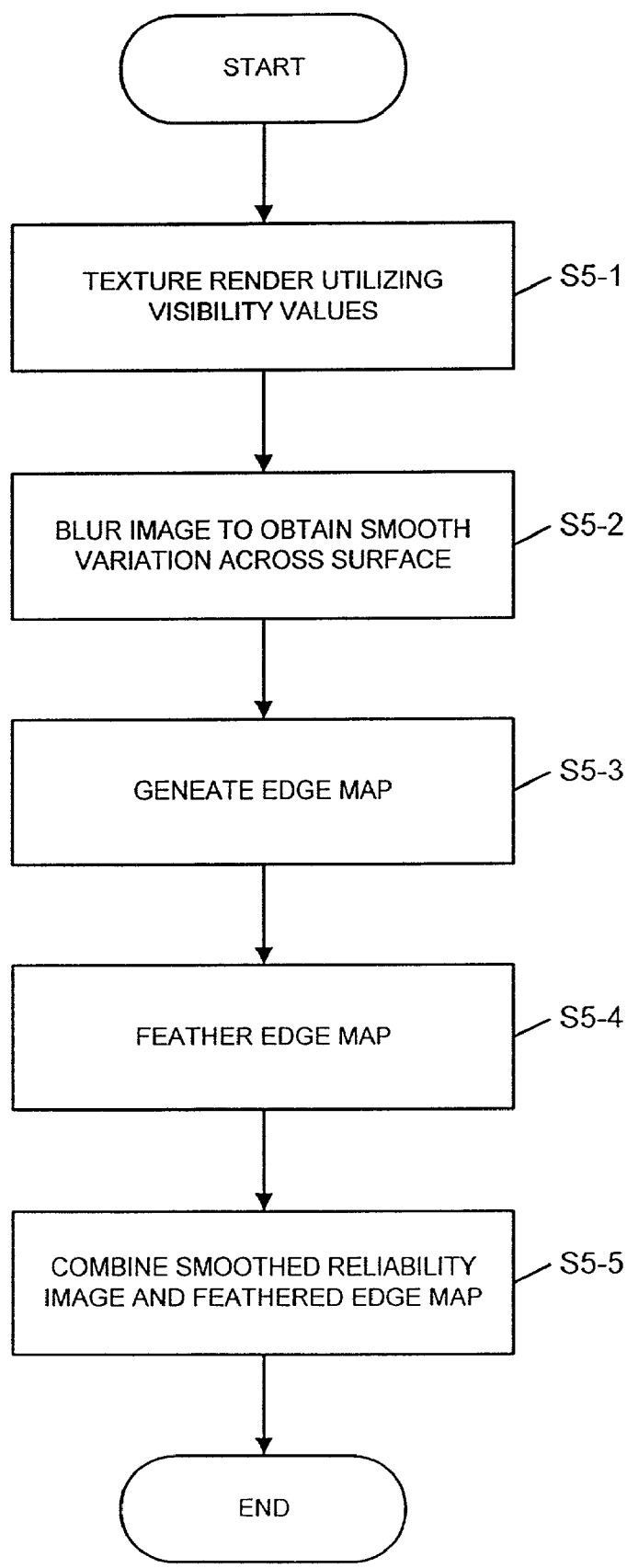
FIG. 5 is a flow diagram of the processing of the weight determination module to generate a weight map image.

FIG. 5 is a flow diagram of the processing of the weight determination module 58 to generate a weight map image of a subject object from a selected viewpoint.

Initially in order to generate a weight map image the weight determination module 58 generates (S5-1) an initial reliability image of the subject object as viewed from the selected viewpoint. In the initial reliability image, the surface of each triangle in a subject object is flat rendered utilizing a visibility value with a value representative of the extent of visibility of the triangle from the selected viewpoint.

In this embodiment an initial value for texture rendering each triangle is calculated by determining the ratio of the number of pixels utilised to render a projection of the triangle in the selected viewpoint relative to the actual surface area of the triangle as calculated from the coordinates of the vertices of the triangle represented by the model data generated by the surface modeller 34. The visibility value for each triangle is then calculated by calculating:

$$\text{visibility value} = int\left[255 * \left(\frac{\text{initial value for triangle}}{\text{greatest initial value}}\right)\right]$$

where greatest initial value is a calculated maximum value for initial values for triangles appearing in images as received from any of the viewpoints identified by position data output by the position determination module 32.

Thus in this way each triangle is associated with a visibility value being an integer value between 0 and 255, where 255 is a value assigned to a square on view of a triangle from the closest of the viewpoints identified by the position determination module 32. An image of a model the subject object seen from the selected viewpoint is then generated using standard Open GL function calls using depth buffering to remove hidden surfaces. In this calculated image each triangle is then rendered flat filled with an intensity value proportional to the calculated visibility value for the triangle, and the remainder of the image rendered with a zero visibility value.

Figure 6A:
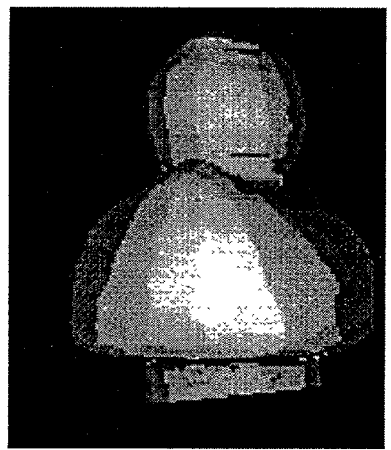
FIGS. 6A, 6B, 7A and 7B are exemplary illustrations of data generated by the weight determination module in order to generate a weight map image for an exemplary object.

FIG. 6A is an example of an image of a subject object rendered flat filled with an intensity values corresponding to visibility values for an exemplary object from a selected viewpoint. Specifically FIG. 6A is an image generated for a model of a toy duck viewed from behind where the tail feathers of the toy duck protrude behind the head of the duck appearing at the top of the image. In the image visibility values corresponding to 0 are shown in black and values corresponding to 255 are shown in white with intermediate values shown as intermediate shades of grey.

As can be seen from FIG. 6A the image generated by flat filling triangles with an intensity value corresponding to the visibility values results in an image in which boundaries between different triangles are apparent. Furthermore, as can be seen from FIG. 6A in the case of portions of the image corresponding to the head and tail features of the toy duck adjacent pixels in the image do not necessarily correspond to neighbouring points on the object surface. Thus in order to generate a weight map image suitable for creating a weight function that varies smoothly across the surface of a model of the subject object and that falls to zero for portions of subject object not visible in a view, this initial reliability image is processed further as will now be described in detail.

Once an initial reliability image has been generated the initial reliability image is first (S5-2) smoothed using a Gaussian smoothing kernel with zero values clamped to zero. In this embodiment the size of the Gaussian blur is selected to represent the projection of a cube placed at the origin and viewed from the selected viewpoint for which weight function data is being generated. The size of the cube in this embodiment is selected to correspond to 1% of the diagonal of the bounding box of the canonical views 50–55 for which texture render data is to be created. The selection of a blur size based upon the size of a predefined cube as seen from the selected viewpoint ensures that the manner in which smoothing occurs is consistent across different images taken at different distances from the origin.

Figure 6B:
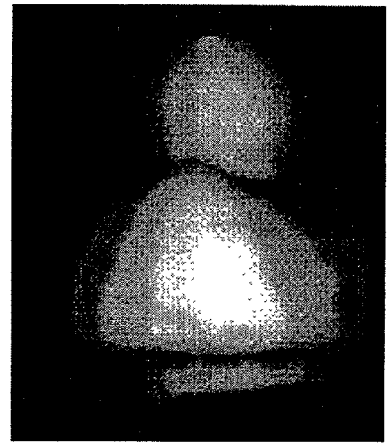

FIG. 6B is an example of a smoothed reliability image being a smoothed image of the initial reliability image of FIG. 6A. Again, as in FIG. 6A, values corresponding to 0 are shown in black and values corresponding to 255 are shown in white with intermediate values shown as intermediate shades of grey. By smoothing the image, a smoothed reliability image is generated in which values vary gradually across the surface of an object which correspond to adjacent visible portions of the image.

However, where adjacent portions of the surface of a subject object correspond to portions both visible and not visible from the selected viewpoint, associating the portions not visible from the selected viewpoint with a zero value can result in a discontinuity in the variation of values over the surface of the object.

To deal with this potential problem the weight determination module 58 then (S5-3) first generates an edge map image identifying all the pixels in an image of the subject object from the selected viewpoint corresponding to edges visible from the selected viewpoint where this problem may occur.

Specifically for each of the triangles in a model generated by the surface modeller 34, the orientation of the surface each of the triangles is first identified. In a system following the open GL conventions for representing three dimensional models, the coordinates of triangles on a three dimensional model are stored so that successive coordinates correspond to coordinates clockwise from the previous set of coordinates. The orientation of an individual triangle can therefore be defined by calculating for a triangle having projected vertices $W_0$, $W_1$, $W_2$ the cross product:

$$(W_1-W_0) \times (W_2-W_1)$$

Whether a particular triangle is oriented towards or away from the camera viewpoint and then be determined by checking whether this calculated cross product is positive or negative.

Once the respective orientations of triangles have been determined, a list of edges can then be calculated by noting all the edges where neighbouring triangles comprise triangles having different orientations. An edge map image for the subject object from the selected viewpoint then can be calculated.

Specifically, utilizing conventional Open GL calls depth of each edge can be determined. The edges which are visible from the viewpoint can then be determined by comparing these depths of edges with the frozen Z buffer values for the initial reliability image. An edge map image of visible edges can then be generated by rendering the edges determined to be visible using the frozen Z buffer values for the initial reliability image. In this embodiment, this image is generated by associating each of the pixels corresponding to an edge with a visibility value of zero and setting the remaining portions of an image to have a visibility value of 255.

Figure 7A:

FIG. 7A is an example of an edge map of visibility values generated for the same viewpoint and subject object as the reliability images of FIGS. 6A and 6B. In FIG. 7A, pixels corresponding to edges are shown rendered in black with the remainder of the image shown in white.

After an edge map image has been generated for a subject object from the selected view the weight determination module 58 then proceeds to generate (S5-4) a feathered edge map image used for ramping the weight values of the corresponding potential problem portions of a smoothed reliability image.

Initially, a feathering window size is selected. In this embodiment, this is selected to correspond to the number of pixels representing the size of the projection of a cube 1% of the length of diagonal of the bounding box placed at the origin in a similar way in to which the blur size used to generate the smoothed reliability image is selected.

A feathered edge map image is then generated from the edge map image by considering for each pixel firstly whether the pixel under consideration is already rendered black, i.e. is associated with a visibility value of 0. If this is the case the next pixel is then selected. If the pixel is not already rendered black, the pixels identified to above and below the current selected pixel to the extent of the selected feathering window size are identified and it is determined whether any of the identified pixels are associated with a visibility value other than 255. If this is the case the selected pixel is then assigned a new feathered value determined by the following equation:

$$\text{feathered value} = \text{Min } [p_i + \sigma d_i]$$

where $p_i$ is the value of a pixel in the window and $d_i$ is the number of pixels between the current pixel, the pixel i in the window and σ is a scaling factor proportional to 255 divided by the window size.

Thus for example where a white pixel in an edge image is directly beneath a pixel having a value equal to 0 the selected pixel would be assigned a value of 0+σ=σ.

After all the pixels in an image have been considered for feathering using a feathering window aligned along columns in an image, the process is then repeated using feathering windows to calculate values from the feathered image where the feathering windows are aligned along the y axis in the image.

Figure 7B:
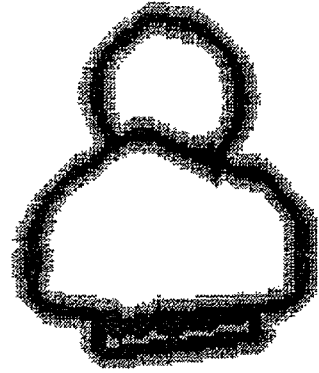

FIG. 7B is an exemplary illustration of the edge map image of FIG. 7A after the edge map has been feathered. In FIG. 7B, pixels associated with a value of 255 are shown in white, pixels associated with a value of 0 are shown in black and intermediate values are shown in grey.

As can be seen from FIG. 7B the feathered edge map image comprises a set of pixels where values of zero are associated with edges and where pixels close to the edges of an object as seen from the viewpoint have intermediate values which gradually increase up to a distance of the selected feathering window from the edge. The remainder of the image, shown in white corresponds with values of 255 for the pixels.

After a feathered edge map image has been generated a final weight map image for the identified viewpoint is then generated (S5-5). This weight map image is generated by selecting for each pixel, the value corresponding to the lesser value of the corresponding pixel in the feathered edge map image and the smoothed reliability image.

Figure 8:
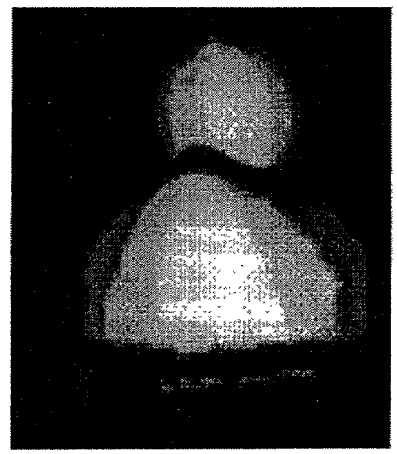
FIG. 8 is a weight map image corresponding to the data represented by FIGS. 6A, 6B, 7A and 7B.

FIG. 8 is an exemplary illustration of a weight map image generated by combining the smoothed reliability image of FIG. 6B with the feathered edge map image of FIG. 7B. Again as in FIGS. 6A, 6B, 7A and 7B, values corresponding to a value of zero are shown in black, values corresponding to a value of 255 are shown in white with intermediate values shown as intermediate shades of grey.

As a result of the smoothing of an initial reliability image, a smoothed reliability image is generated which result in portions of adjacent surface of a subject object corresponding to adjacent portions in an image from a selected viewpoint being associated with values which vary gradually over the surface of the object. The effect of combining this smoothed image with a feathered edge map is to ensure that visible portions of the surface of an object adjacent to portions that are not visible from a selected viewpoint are associated with smoothly varying values that fall to zero adjacent to the parts of the surface of an object that are not visible.

Figure 9:
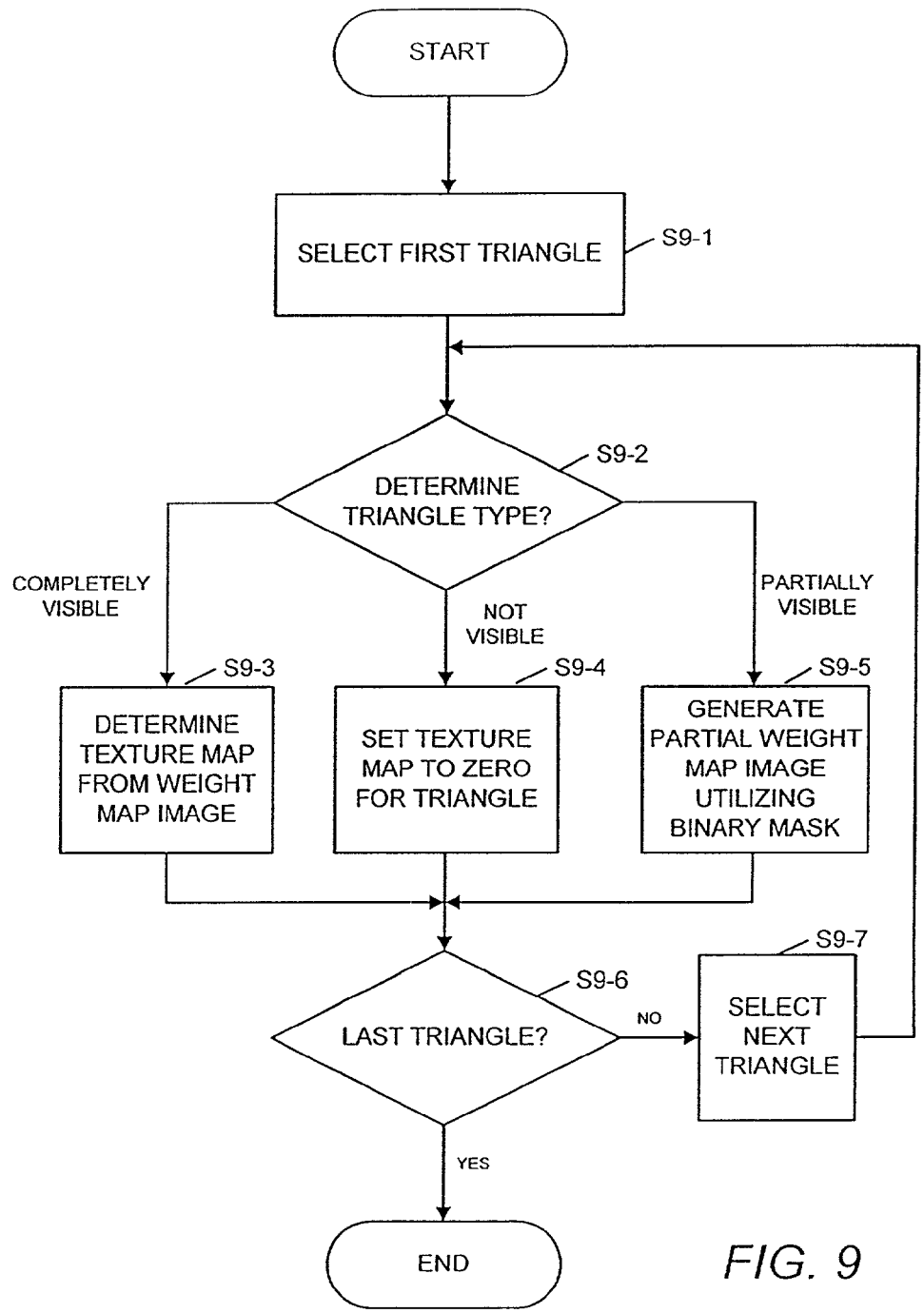
FIG. 9 is a flow diagram of the processing of the weight determination module to generate weight function data utilizing a weight map image.

The function implicitly defined by the weight map image for visible portions of a subject object together with identifying the remaining portions of a subject object to zero is then made explicit by utilizing the weight map image to generate a texture map render function for the entire of the surface of a subject object as will now be described with reference to FIG. 9 which is a flow diagram of the process of generating a texture map render function.

Initially (S9-1) the weight determination module 58 selects a first triangle from the three dimensional model data generated by the surface modeller 34 for a subject object.

The weight determination module 58 then (S9-2) determines whether the selected triangle is either completely visible, partially visible or not visible from the currently selected viewpoint.

In this embodiment this is achieved by utilizing conventional Open GL calls to render the 3D model generated by the surface modeller 34 as seen from the perspective defined by the position data of the image being processed. The generated image data is then utilized to calculate a visibility score.

Specifically, initially all of the triangles of the 3D model viewed from the viewpoint defined by the selected position data are rendered using a single colour with Z buffering enabled. This Z buffer data is then equivalent to a depth map. The triangle being processed is then re-rendered in a different colour with the Z buffering disabled. The selected triangle is then once again re-rendered utilizing a third colour with the Z buffering re-enabled so as to utilize the depth values already present in the Z buffer. When re-rendering the glPolygonOffset OpenGL function call is then utilized to shift the triangle slightly towards the defined camera viewpoint defined by the position data to avoid aliasing effects.

A visibility score for the triangle being processed as viewed from the viewpoint defined by the currently selected position data is then determined by calculating the number of pixels in the image rendered in the second and third colours.

Specifically, if there are any pixels corresponding to the second colour in the generated image data, these are parts of the currently selected triangle that are occluded by other triangles and hence the selected triangle is partially hidden from the viewpoint defined by the position data. A visibility score for the triangle as perceived from the defined viewpoint is then set for the triangle where:

$$\text{visibility score} = \frac{\text{no pixels in 3rd colour}}{\text{no pixels in 2nd or 3rd colour}}$$

Thus in this way, where the entirety of a triangle is visible within an image a visibility value of one is associated with the triangle for the selected viewpoint. Where a triangle is occluded by other triangles when viewed from a selected viewpoint by the position data being processed, a visibility score of less than one is associated with the triangle at image position. If a triangle is completely occluded by other triangles a visibility score of zero is associated with the triangle.

The processing to colour a triangle by rendering and re-rendering a triangle utilizing the stored values in the Z buffer as previously described enables triangles to be processed even if two small adjacent triangles are mapped to the same pixel in the selected viewpoint. Specifically, if triangle depths are similar for triangles corresponding to the same portion of an image, the glPolygonOffset call has the effect of rendering the second colour in the front of other triangles the same distance from the selected viewpoint. Thus when the visibility of the selected triangle is determined, the triangle is only given a lower visibility value if it is obscured by other triangles closer to the defined viewpoint and not merely obscured by the rendering of triangles at the same distance to the same portion of an image.

Where the selected triangles determined to be completely visible, ie. the visibility value for the triangle=1, a texture map render function is generated (S9-3) by identifying the source for a texture render function from the projection of the corresponding triangle into the weight map image generated for that viewpoint.

Where a triangle is determined not to be visible in a selected image, a texture render function for rendering the entirety of the triangle with a value of zero is stored (S9-4).

Where a triangle is determined to be partially visible a binary mask is utilized to generate (S9-5) a texture map for the triangle.

Specifically, in this embodiment, a bounding box for the pixels rendered in the second or third colour when calculating visibility score for the triangle is first determined. Initial texture render map data for the triangle is then generated by copying the region of the generated weight map image within the boundary box. All values in the generated copy of the portion of the image within the boundary box which corresponds to a colour other than the third colour utilised when calculating the visibility value for the triangle are then set to zero. The texture map render function for the triangle is then defined by the values of pixels in this amended copy of a region of the weight map image with texture coordinates being the projection of the triangle under consideration projected into the amended copy of the region of the weight map image in the same way in which the triangle is projected into the corresponding region of the weight map image.

After a texture render function has been assigned to the triangle currently under consideration, the weight determination module 58 then (S9-6) determines whether the triangle for which a texture render function has, just been calculated corresponds to the final triangle in a model generated by the texture modeller 34. If this is not the case the weight determination module 58 then (S9-7) proceeds to select the next triangle in the model before determining a texture render function for the newly selected triangle (S9-2–S9-5) and then once again (S9-6) determining whether a texture render function for all the triangles in the model have been created.

When texture render functions have been determined and stored for all of the triangles for one viewpoint, the weight determination module 58 then selects a new viewpoint for generating texture render functions.

Thus in this way the weight determination module 58 generates and stores texture render functions for the entirety of the surface of a subject object for each of the viewpoints corresponding to viewpoints of input image data in the input data store 26. These texture render functions are then output as weight function data by the weight determination module 58 to the texture map generation module 59.

Generation of Texture Maps

Utilizing conventional texture rendering techniques, it is possible to generate image data corresponding to projected images as perceived from each of the canonical views 50–55 where the surface of a model of a subject object is texture rendered utilizing input image data identified as having been recorded from a camera viewpoint corresponding to position data output by the position determination module 32 for that image data.

It is also possible utilizing conventional techniques to generate projected images corresponding to the projection of the surface of a model texture rendered in accordance with calculated texture render functions for the surface of the model as viewed from each of the canonical views 50–55 from the output weight function data.

As described above, the weight function data generated and output by the weight determination module 58 is calculated so as to be representative of the relative visibility of portions of the surface of a model from defined viewpoints. The projected images of the weight functions are therefore indicative of relative preferences for using the corresponding portions of projections of image data from the corresponding viewpoints to generating the texture data for the texture map for each of the canonical views. These projected weight function images, hereinafter referred to as canonical confidence images can therefore be utilized to select portions of projected image data to blend to generate output texture maps for canonical views 50–55.

Figure 10:
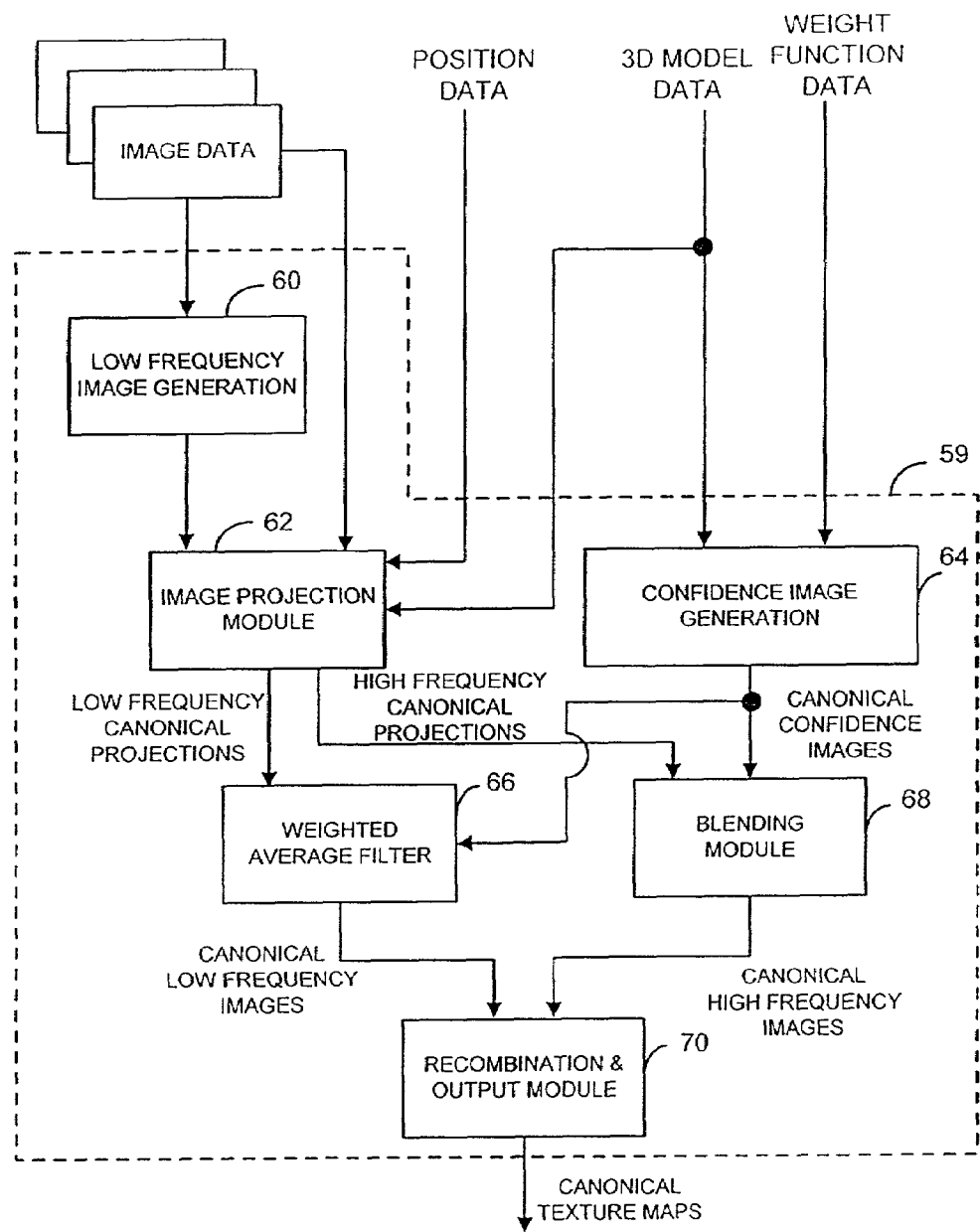
FIG. 10 is a schematic block diagram of the texture map determination module of FIG. 3.

FIG. 10 is a schematic diagram of notional functional modules of the texture map determination module 59 for generating canonical texture maps for each of the canonical views 50–55 from image data stored within the input data store 26, position data output by the position determination module 32, 3D model data generated by the surface modeller 34 and the weight function data output by the weight determination module 58.

The applicants have appreciated that generation of realistic texture for a model of a subject object can be achieved by blending images in different ways to average global lighting effects whilst maintaining within the images high frequency details such as highlights and shadows.

Thus in accordance with this embodiment of the present invention the texture generation module 59 comprises a low frequency image generation module 60 for extracting low frequency image information from image data stored within the input data store 26, an image projection module 62 for generating high and low frequency canonical image projections; a confidence image generation module 64 for generating canonical confidence images; a weighted average filter 66 and a blending module 68 for processing high and low frequency canonical projections and the canonical confidence images to generate blended high and low frequency canonical images; and a re-combination of output module 70 for combining the high and low frequency images and outputting the combined images as texture maps for each of the canonical views 50–55.

In order to generate high and low frequency canonical projections of each of the input images stored within the input data store 26 projected into each of the six canonical views, initially each item of image data in the input data store 26 is passed to the low frequency image generation module 60.

This module 60 then generates a set of low frequency images by processing the image data for each of the views in a conventional way by blurring and sub-sampling each image. In this embodiment the blurring operation is achieved by performing a Gausian blur operation in which the blur radius is selected to be the size of the projection of a cube placed at the centre of the object bounding box defined by the six canonical views 50–55 and whose sides are 5% of the length of the diagonal of the bounding box. The selection of the blur radius in this way ensures that the radius is independent of image resolution and varies depending upon whether the image is a close up of a subject object (large radius) or the subject appears small in the image (small radius).

These low frequency images are then passed to the image projection module 62 together with copies of the original image data stored within the input data store 26, position data for each of the images as determined by the position determination module 32 and 3D model data for the model generated by the surface modeller 34.

For each of the input images from the input data store 26 the image projection module 62 then utilizes the position data associated with the image and the 3D model data output by the surface modeller 34 to determine calculated projections of the input images as perceived from the six canonical views 50–55 utilizing standard texture rendering techniques.

In the same way the image projection module 62 generates for each of low frequency images corresponding to image data processed by the low frequency image generation module 60, six low frequency canonical projections for the six canonical views 50–55.

Six high frequency canonical image projections for each image are then determined by the image projection module 62 by performing a difference operation, subtracting the low frequency canonical image projections for an image as viewed from a specified canonical view from the corresponding image projection of the raw image data for that view.

The low frequency canonical projections and high frequency canonical projections of each image for each of the six canonical views are then passed to the weighted average filter 66 and the blending module 68 for processing as will be detailed later.

By processing the image data from the input data store 26 in this way it is possible to ensure that the processing of images generates high and low frequency canonical projections of each image that are consistent with one another. In contrast, if a blurring operation is performed upon canonical image projections created from image data stored within the input data store 26, as the pixel data in these generated projections is normally dependent upon different regions of the original image data, the blurring operation will not be consistent across all six canonical images and hence will introduce errors into the generated texture maps.

The confidence image generation module 64 in this embodiment is arranged to receive 3D model data from the surface modeller 34 and weight function data from the weight function determination module 58. The confidence image generation module 64 then processes the 3D model data and weight function data to generate for each of the viewpoints corresponding to the viewpoints of each input images in the input data store 26, a set of six canonical confidence images for the six canonical views 50–55. This is achieved by the confidence image generation module 64 utilizing the texture render functions for each viewpoint to calculate a set of canonical confidence images for that viewpoint, using conventional texture rendering techniques.

Thus in this way for each of the six canonical views, a canonical confidence image for each viewpoint corresponding to a viewpoint from which image data of a subject object is available is generated. The pixel values of canonical confidence images generated in this way are each representative of the relative preference for utilizing corresponding portions of canonical projections of image data representative of the viewpoint for which the weight function was generated to generate texture map data. These canonical confidence images are then passed to the weighted average filter 66 and the blending module 68, so that texture data for the six canonical views can be generated utilizing the data identifying preferred sources for generating portions of texture map data.

Thus after the processing of image data and weight function data by the low frequency image generation module 60, the image projection module 62 and the confidence image generation module 64, the weighted average filter 66 and blending module 68 receive, for each item of image data stored within the input data store 26 a set of six canonical confidence images identifying the extent to which portions of projected images derived from a specified image are to be preferred to generate texture data and a set of six projections of either the high or low frequency images corresponding to the item of image data. The weighted average filter 66 and the blending module 68 then proceed to process the confidence images and associated low and high frequency canonical projections in turn for each of the canonical views as will now be described in detail.

Processing of Low Frequency Canonical Projections

Figure 11:
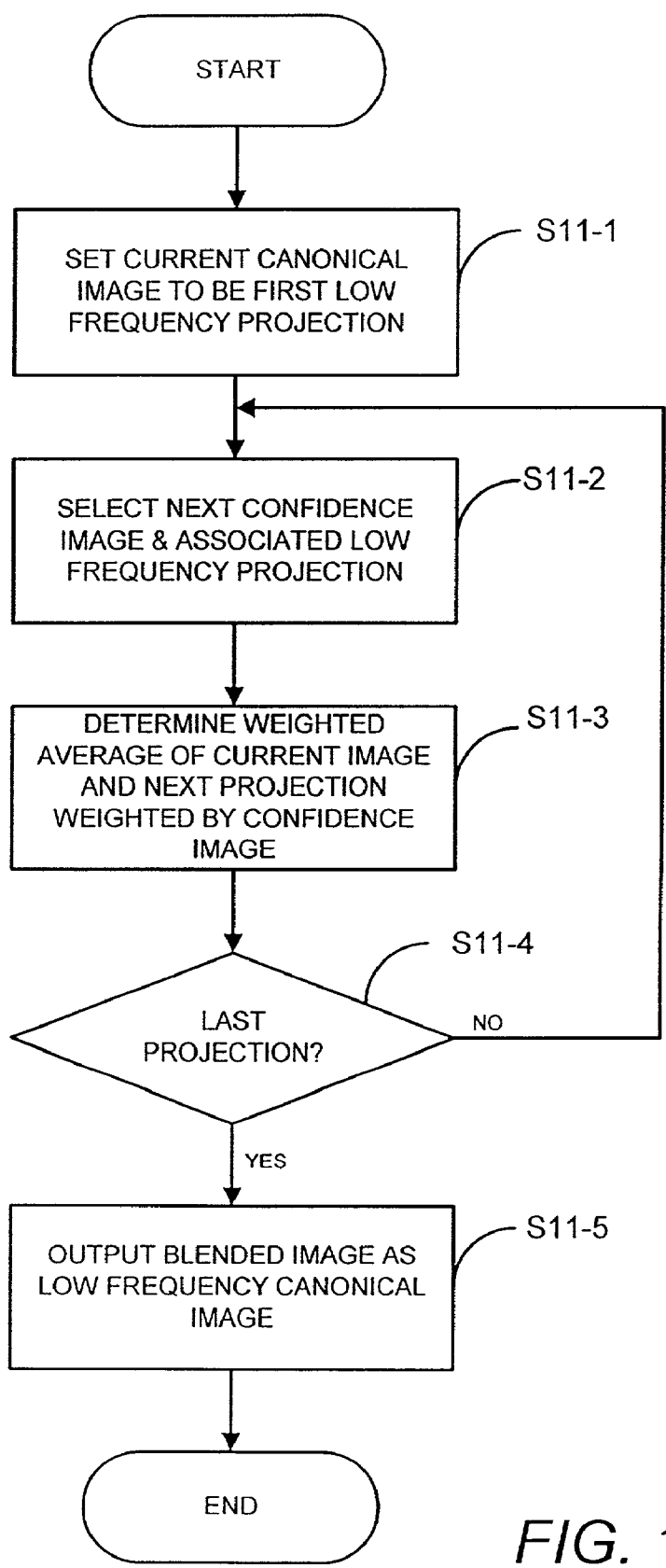
FIG. 11 is a flow diagram of the processing of low frequency canonical projections.

FIG. 11 is a flow diagram of the processing of low frequency canonical projections and associated canonical confidence images for a specified canonical view for each of a set of input images stored within the input data store 26.

Initially (S11-1) the weighted average filter 66 selects a first low frequency canonical projection and its associated confidence image. This is then made the basis of an initial low frequency canonical image to be generated by the weighted average filter 66. The weighted average filter 66 then selects (S11-2) the next low frequency projection for the same canonical view together with the projection's associated confidence image.

The weighted average filter 66 then (S11-3) determines as a new low frequency canonical image a canonical image comprising for each pixel in the image a weighted average of the current low frequency canonical image and the selected low frequency canonical projection weighted by the confidence scores utilising the following formula:

$$\text{pixel value} = \frac{C_i}{C + C_i} * \begin{bmatrix} \text{Pixel Value in} \\ \text{selected projection} \end{bmatrix} + \frac{C}{C + C_i} * \begin{bmatrix} \text{Pixel Value in} \\ \text{canonical image} \end{bmatrix}$$

where C is the current confidence score associated with the pixel being processed for the canonical image and $C_i$ is the confidence score associated with the pixel in the confidence image associated with the selected projection.

The confidence score for the pixel in the canonical image is then updated by adding the confidence score for the latest projection to be processed to the current confidence score. That is to say the new confidence score $C_{new}$ is calculated by the equation $$C_{new}=C_{old}+C_i$$

where $C_{old}$ is the previous confidence score associated with the current pixel and $C_i$ is the confidence score of the current pixel in the projection being processed.

The weighted average filter 66 then (S11-4) determines whether the latest selected low frequency canonical projection is the last of the low frequency canonical projections for the canonical view currently being calculated. If this is not the case the weighted average filter 66 then proceeds to utilize the determined combined image to generate a new combined image utilizing the next confidence image and associated low frequency image projection (S11-2–S11-4).

When the weighted average filter 66 determines (S11-4) that the last of the low frequency canonical projections for a specified canonical view 50–55 has been processed the weighted average filter 66 outputs (S11-5) as a blended canonical low frequency image the image generated utilizing the weighted average of the last projected image processed by the average weighted filter 66.

Thus in this way the weighted average filter 66 enables for each of the canonical views 50–55 a low frequency image to be created combining each of the low frequency canonical projections weighted by confidence scores indicative of the portions of the images identified as being most representative of the surface texture of a model in the canonical confidence images. As the low frequency images are representative of average local colour of surfaces as effected by global lighting effects, this processing by the weighted average filter 66 enables canonical low frequency images to be generated in which these global lighting effects are averaged across the best available images where greater weight is placed on images in which portions of a model are most easily viewed giving the resultant canonical low frequency images a realistic appearance and a neutral tone.

Processing of High Frequency Canonical Projections

Figure 12:
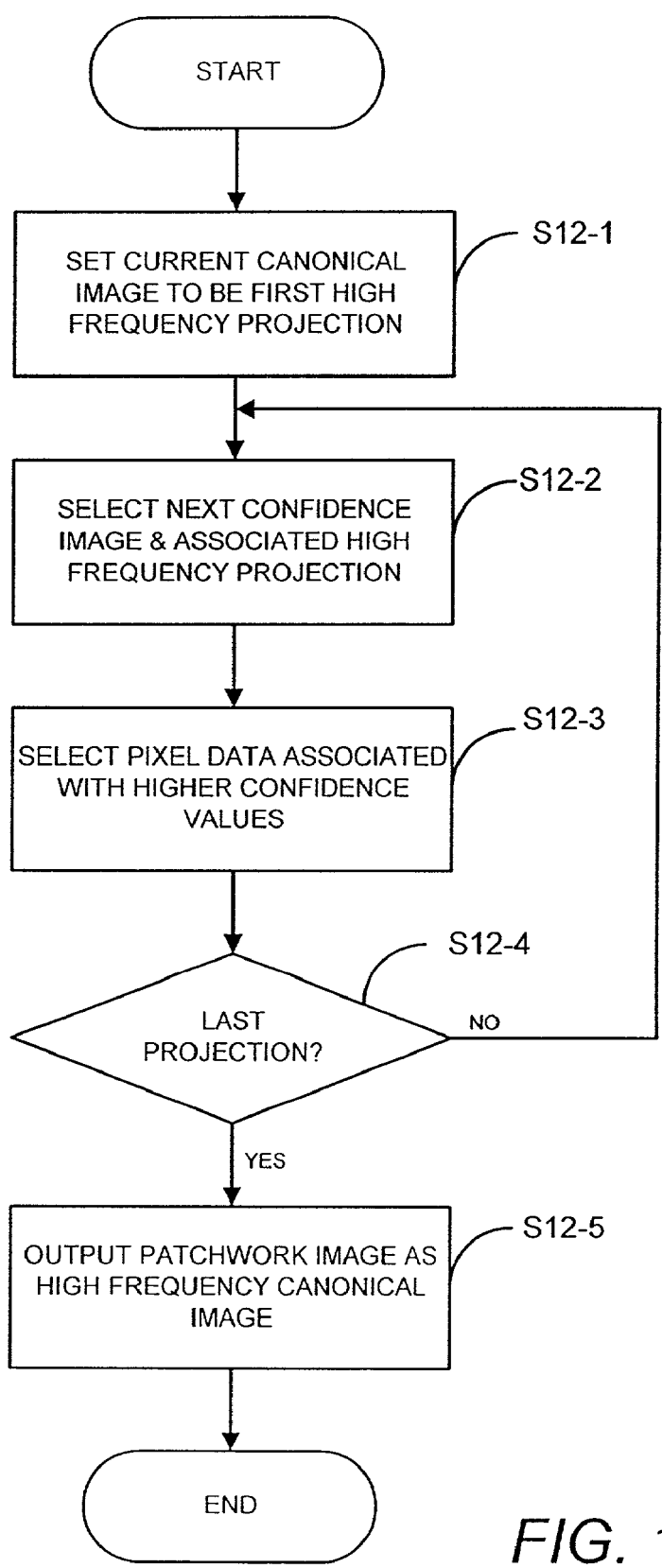
FIG. 12 is a flow diagram of the processing of high frequency canonical projections.

FIG. 12 is a flow diagram of the processing of canonical confidence images and associated high frequency canonical projections for generating a canonical high frequency image for one of the canonical views 50–55. This processing is repeated for each of the canonical views 50–55.

The processing of the blending module 68 for generating high frequency canonical images is identical to that of the processing of the weighted average filter 66 except instead of determining weighted averages of pixels in the canonical projections and canonical images, in this embodiment the blending module 68 selects as canonical image data pixel data, pixel data associated with the greatest confidence scores.

Specifically, after selecting an initial high frequency projection and associated confidence image to be the initial high frequency canonical image and associated confidence image (S12-1) and selecting the next projection and confidence image for processing (S12-2), the blending module 68 then updates the pixels in the current high frequency canonical image (S12-3).

This is achieved by the blending module 68 selecting for each pixel in the image either pixel data for the corresponding pixel in the high frequency canonical projection being processed or the pixel data for the current high frequency canonical image. The selection is made for each pixel by determining whether the corresponding pixel in the confidence image associated with the high frequency projection being processed has a greater confidence score than the confidence score associated with the pixel in the current canonical image. The pixel data associated with the highest score is then utilised as pixel data for the canonical image. The confidence score associated with the pixel in the updated canonical image is then set to the greater of the confidence scores for the pixel as identified by either the confidence image associated with the canonical image or the projection currently be processed.

The blending module 68 then determines (S12-4) whether all of the high frequency image projections for a canonical user have been processed. If this is not the case then the next projection and confidence image are utilised to update the high frequency canonical image being generated (S12-2–S12-4). When all of the canonical projections have been processed the final canonical image is then output (S12-5).

Thus in this way a high frequency canonical image is generated utilising all of the available high frequency image projections where each pixel of the high frequency canonical image corresponds to pixel data from the available high frequency image projections associated with the greatest of the confidence scores for that pixel As the confidence scores are indicative of the relative goodness for selecting pixels for generating image data, the high frequency canonical images therefore correspond to a patchwork of the best available pixel data for each part of the high frequency canonical images Thus in this way six low frequency canonical images for the six canonical views 50–55 and six high frequency canonical images are generated by the weighted average filter 66 and the blending module 68 respectively. In the canonical low frequency images the global lighting effects are averaged across the available low frequency canonical projections in proportion to the relative preference for utilizing portions of an image as identified by the canonical confidence images associated with the projections. In the high frequency canonical images, high frequency canonical projections are selected in the above described manner to ensure that high frequency detail and contrast in the canonical images is maintained when the different high frequency canonical projections are combined.

When the six canonical low frequency images and six canonical high frequency images are then received by the recombination output module 70 for each canonical view 50–55 the recombination and output module 70 generates a single canonical texture map by adding the high and low frequency images for each view. The combined canonical texture maps are then output by the recombination and output module 70 for storage in the output data store 44 together with the 3D model data generated by the surface module 34.

The output canonical texture maps can then be utilized to texture render image representations of the model generated by the surface modeller 34 by associating each of the triangles identified by the three-dimensional model data with one of the texture maps. In this embodiment the selection of texture data to texture render each triangle is determined by selecting as the map to be utilized the map in which the triangle has the greatest visibility. In this embodiment, the visibility of a triangle in an image is determined utilizing a visibility score calculated in the same way as has been described above for the calculation of visibility scores for generating texture map render functions.

By calculating the visibility in the manner described above, a value indicative of the extent to which a triangle in a model is or is not occluded from the selected viewpoint is determined. Other factors, however, also effect the extent to which use of particular portion image data for generating texture data may be preferred. For example, close up images are liable to contain more information about the texture of an object and therefore may be preferable sources for generating texture data. A further factor which may determine whether a particular image is preferable to use for generating texture data is the extent to which a portion of the image is viewed at oblique angle. Thus in this embodiment the visibility for a triangle in a canonical view is determined by utilizing the following equation:

$$\text{visibility} = \frac{\text{visibility score} * \cos\theta}{\text{distance}}$$

where θ is the angle of incidence of a ray from the optical centre of the camera defining the image plane of a canonical being processed to the normal of the centroid of the selected triangle and the distance is the distance between the centroid of selected triangle and the optical centre of the camera.

Thus in this way in this embodiment the amount of occlusion, the obliqueness of view and the distance between image plane and a triangle being modelled all effect the visibility associated with a triangle. In alternative embodiments either only some of these factors could be utilized or alternatively greater weight could be placed on any particular factor.

When visibility has been calculated for a triangle for each of the canonical views, the view in which a triangle is most visible is selected and texture co-ordinates for texture rendering the model generated by the surface modeller 34 are then implicitly defined by the projection of the triangle onto the selected canonical view 50–55.

Images of the model of the subject object can then be obtained for any viewpoint utilizing the output canonical texture maps and the 3D model data stored in the output data store 44, for display on the display device 4 and a hard copies of the generated images can be made utilizing the printer. The model data and texture map stored in the output data store 44 can also be output as data onto a storage device 46,48.

Second Embodiment

In the first embodiment of the present invention, an image processing apparatus was described in which input data defining a plurality of images of a subject object recorded from different viewpoints were processed to generate texture data comprising six canonical texture maps being views for a cuboid bounding a model of the subject object. Although generating texture maps in this way ensures that the total number of required view is limited to six, this does not guarantee that every triangle within the model is visible in at least one of the canonical views. As a result, some portions of a model may be texture rendered utilizing surface information corresponding to a different portion of the surface of the model. In this embodiment of the present invention an image processing apparatus is described in which texture data is generated to ensure that all triangles within a 3D model are rendered utilizing texture data for the corresponding portion of the surface of a subject object, if image data representative of the corresponding portion of the subject object is available.

The image processing apparatus in accordance with this embodiment of the present invention is identical to that of the previous embodiment except the surface texturer 36 is replaced with a modified surface texturer 80.

Figure 13:
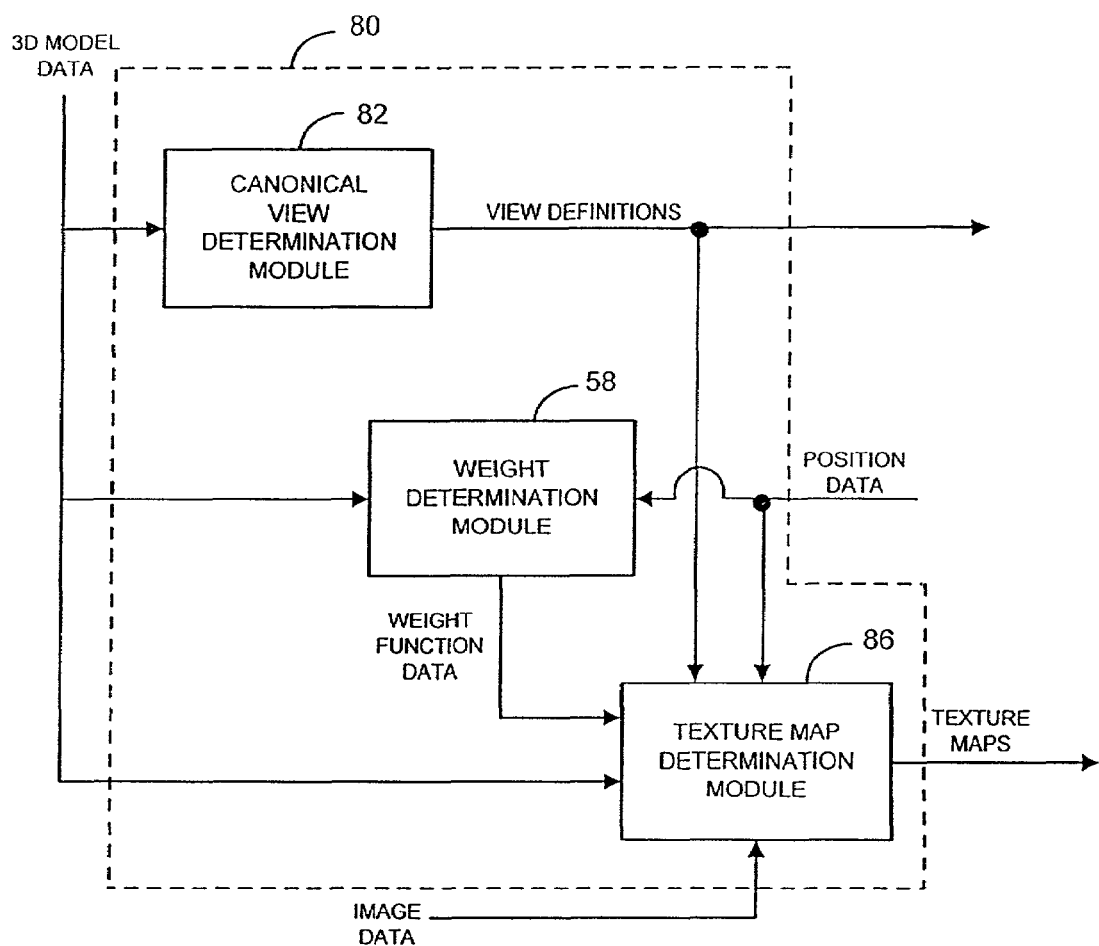
FIG. 13 is a schematic block diagram of a surface texturer in accordance with a second embodiment of the present invention.

FIG. 13 is a schematic block diagram of the notional functional modules of the modified surface texturer module 80. The modified surface texturer 80 comprises a canonical view determination module 82; a weight determination module 58 identical to the weight determination module 58 of the surface texturer 36 of the previous embodiment and a modified texture map determination module 86.

In this embodiment the canonical view determination module 82 is arranged to determine from the 3D model data output by the surface modeller 34 whether any portions of the surface of the 3D model are not substantially visible from the six initial canonical views. If this is determined to be the case the canonical view determination module 82 proceeds to define further sets of canonical views for storing texture data for these triangles. These view definitions are then passed to the texture map determination module 86. The modified texture map determination module 86 then generates canonical texture map data for the initial canonical views and these additional canonical views which are then utilized to texture render the surface of the model generated by the surface modeller 34.

Figure 14:
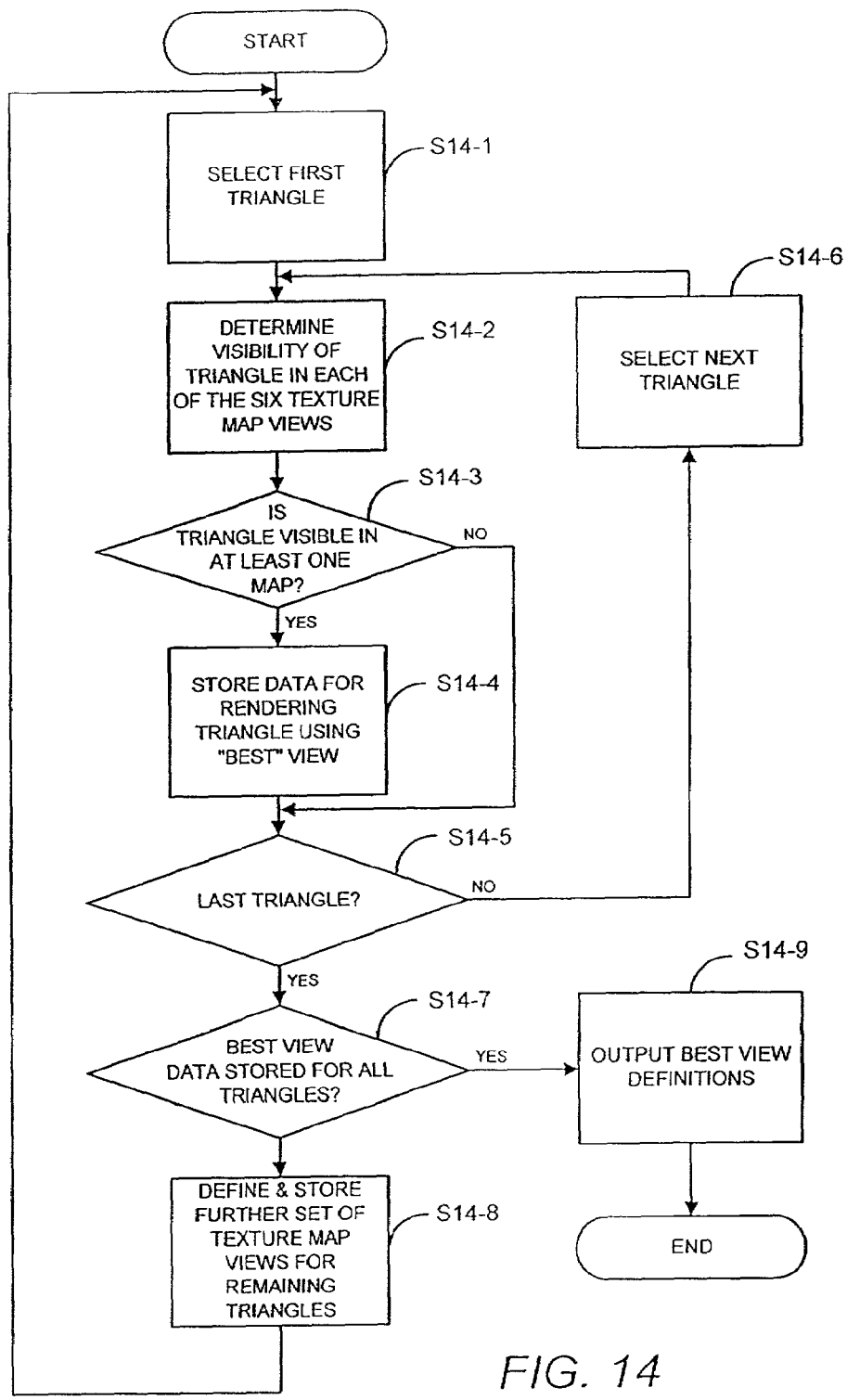
FIG. 14 is a flow diagram of the processing of the canonical view determination module the surface texturer of FIG. 13.

The processing of the canonical view determination module 82 in accordance with this embodiment of the present invention will now be described with reference to FIG. 14 which is a flow diagram of the processing of the canonical view determination module 82.

Initially (S14-1) the canonical view determination module 82 selects a first triangle of the model generated by the surface modeller 34. The canonical view determination module 82 then (S14-2) generates a visibility score for the triangle as perceived from each of the six canonical views in a similar manner to which a visibility score is generated as has previously been described in relation to the previous embodiment.

The canonical view determination module 82 then (S14-3) determines whether the visibility score associated with the triangle being processed is greater than a threshold value indicating that the triangle is at least substantially visible in at least one of the views. In this embodiment this threshold value is set to 0.75 so that all triangles which are at least 75% visible in one of the views are identified as being substantially visible.

If the canonical view determination module 82 determines that the triangle being processed is substantially visible i.e. has a visibility score of greater than 0.75 in at least one view, the canonical view determination module selects from the available canonical views the view associated with the greatest visibility as determined in the manner previously described. Data identifying the canonical view in which the selected triangle is most visible is then stored. Thus in this way data identifying the canonical view in which texture data for rendering the triangle is subsequently to be utilized is generated.

The canonical view determination module 82 then (S14-5) determines whether the currently selected triangle corresponds to the last triangle of the 3D model generated by the surface modeller 34. If this is not the case the canonical view determination module 82 then proceeds to select the next triangle and determine visibility scores for that next triangle (S14-6–S14-5).

When the canonical view determination module 82 determines that all of the triangles have been processed (S14-5) the canonical view determination module 82 then (S14-7) determines whether data identifying a best view has been stored for all of the triangles.

If this is not the case the canonical view determination module 82 generates and stores a list of triangles for which no best view data has been stored (S14-8) the canonical view determination module 82 then proceeds to establish visibility scores of these remaining triangles in the six canonical views in the absence of the triangles for which best view data has already been stored (S14-1–S14-7) and establish best views for substantially visible triangles. This process is then repeated until best view data is stored for all of the triangles.

When the canonical view determination module 82 determines (S14-7) that best view data has been stored for all the triangles the canonical view determination module 82 then outputs (S14-9) view definition data comprising for each triangle the canonical view in which it is most visible together with the generated lists of the triangles not visible canonical views. These lists and identified views in which the triangles are best represented are then output and passed to the modified texture map determination module 86.

When the modified texture map determination module 86 processes the 3D model data, weight function data, image data and position data this generates the six original canonical views in the same manner as has been described in relation to the first embodiment.

However, additionally the texture map determination module 86 generates for the triangles not visible in the original six canonical views as identified by the lists output by the canonical view determination module 82 further texture maps corresponding to the projection of the triangles identified by the lists of triangles generated by the canonical view determination module 82 in the six canonical views in the absence of the other triangles. These additional canonical views are generated from the high and low frequency canonical projections of image data generated by the image projection module 62 of the modified texture map determination module 86 and additional canonical confidence images being canonical projections of only the triangles identified by the lists of triangles output by the canonical view determination module 82. These additional confidence images being calculated for the triangles identified in the lists utilizing the weight function data generated by the weight determination module 58 in the same way as has previously been described in relation to the first embodiment.

Thus in this way additional texture maps are generated for those portions of the surface of the model which are not substantially visible in the original six canonical views. As these partial additional texture maps are generated in a similar way to the main canonical views they should also be representative of projections of portions of an image and hence suitable for compression utilizing the standard image compression techniques.

The original canonical views together with these additional canonical views can then be utilized to texture render the model where the texture maps utilized to render each triangle is selected utilizing the lists and the data identifying the best views as are output by the canonical view determination module 82.

Third Embodiment

A third embodiment of the present invention will now be described. In the first embodiment a blending module 68 was described which selected pixel data corresponding to the pixels associated with the highest confidence scores for the corresponding pixel in associated confidence images. A problem with such a selection system is that boundaries can develop in the generated texture map data indicative of the selection of pixel data from different image sources. The obvious solution to this problem performing an averaging operation such as that performed by the weighted average filter 66 is undesirable as this results in loss of contrast within the texture maps data. In this embodiment the blending module 68 is arranged to process high frequency canonical projections in a way which avoids noticeable boundaries arising within texture map data, whilst maintaining image contrast.

Figure 15:
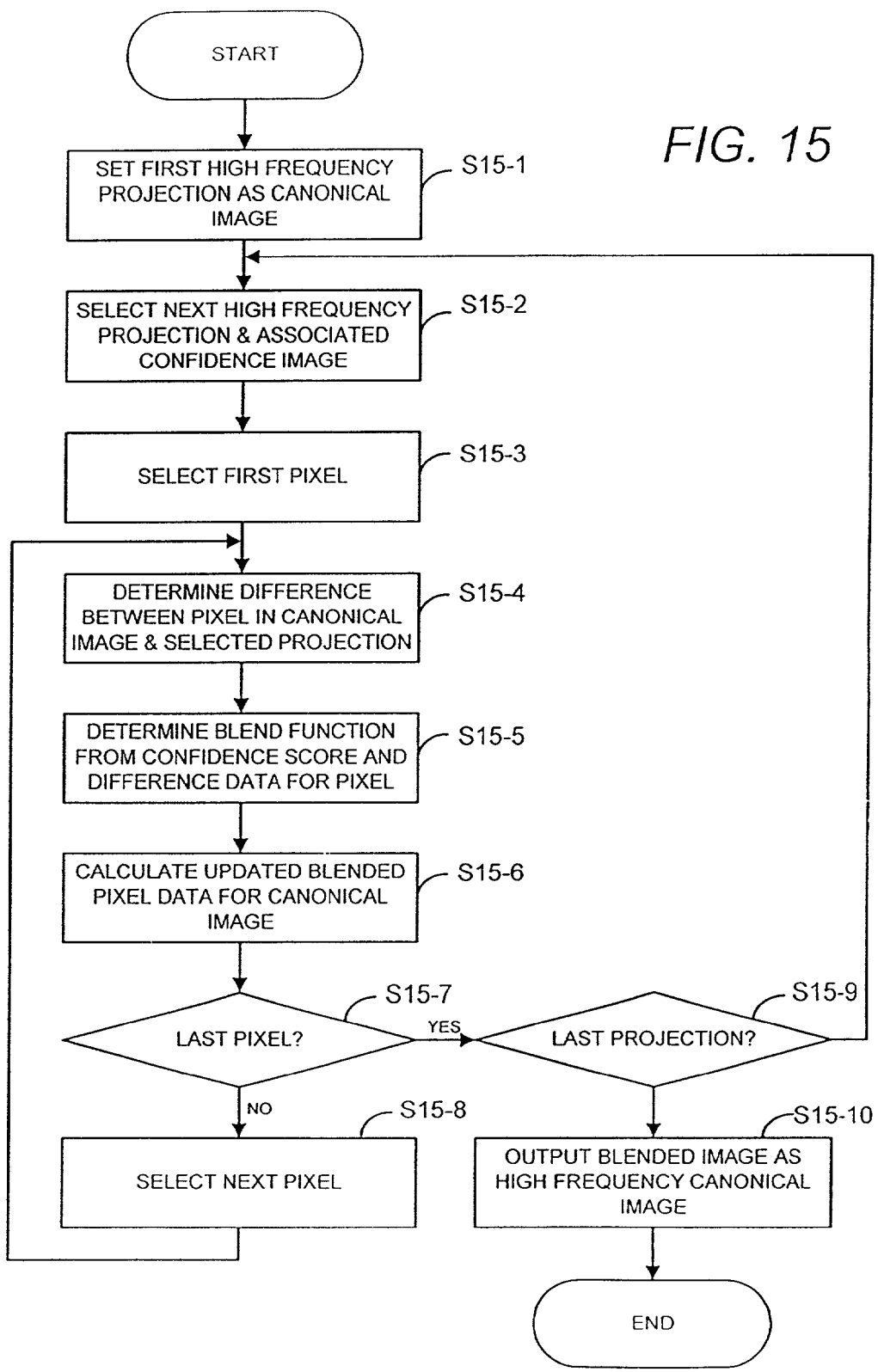
FIG. 15 is a flow diagram of the processing of high frequency canonical projections in accordance with a third embodiment of the present invention.

FIG. 15 is a flow diagram of the processing canonical confidence images and associated high frequency canonical image projections by the blending module 68 in accordance with this embodiment of the present invention.

Initially (S15-1) the blending module 68 selects a first one of the high frequency canonical projections for the canonical view for which a canonical high frequency image is to be generated and sets as an initial canonical high frequency image an image corresponding to the selected first high frequency projection.

The blending module 68 then (S15-2) selects the next high frequency canonical projection for that canonical view and its associated canonical confidence image for processing.

The first pixel within the canonical high frequency image is then selected (S15-3) and the blending module 68 then (S15-4) determines for the selected pixel in the high frequency canonical image a difference value between the pixel in the current high frequency canonical image and in the corresponding pixel in the high frequency canonical projection being processed.

In this embodiment, where the high frequency canonical projections and canonical high frequency images comprise colour data, this difference value may be calculated by determining the sum of the differences between corresponding values for each of the red, green and blue channels for the corresponding pixels in the selected high frequency canonical projection and the canonical high frequency image being generated.

Alternatively, where the image being processed comprises grey scale data, this difference value could be determined by calculating the difference between the pixel in the canonical high frequency image and the corresponding pixel in the high frequency canonical projection being processed.

It will be appreciated that more generally in further embodiments of the invention where colour data is being processed any suitable function of the red, green and blue channel values for corresponding pixels in the high frequency canonical projection being processed and the canonical high frequency image being generated could be utilized to generate a difference value for a pixel.

After the difference value for the pixel being processed has been determined, the blending module 68 then (S15-5) determines a blend function for the selected pixel from the confidence scores associated with the pixel and the determined difference value for the pixel.

In this embodiment this blend function is initially determined by selecting a gradient G in dependence upon the determined difference value for the pixel. Specifically, in this embodiment the value G is calculated by setting $$G = \frac{D}{D_0} \text{ for } D \geq D_0$$

$$G = 1 \text{ for } D < D_0$$

where D is the determined difference value for the pixel and $D_0$ is a blend constant fixing the extent to which weighting factors are varied due to detected differences between images. In this embodiment where the difference values D are calculated from colour image data for three colour channels each varying from 0 to 255, the value of $D_0$ is set to be 60.

An initial weighting fraction for calculating a weighted average between the pixel being processed in the current canonical high frequency image and the corresponding pixel in the high frequency canonical projection being processed is then set by calculating:

$$W_0 = \left(\frac{C_i}{C+C_i} - 0.5\right)G + 0.5$$

where $C_i/(C+C_i)$ is the relative confidence score associated with the pixel being processed in the confidence image associated with the selected high frequency canonical projection being the ratio of the confidence score $C_i$ associated with the pixel in the current image being processed to the confidence score associated with the pixel by the canonical image and G is the gradient determined utilizing the determined difference value D for the pixel.

A final weighting fraction is then determined by setting the weighting value W with:

W=0 if $W_o$<0

W=1 if $W_o$>1; and

W=$W_o$ if $0 \leq W_o \leq 1$

Figure 16:
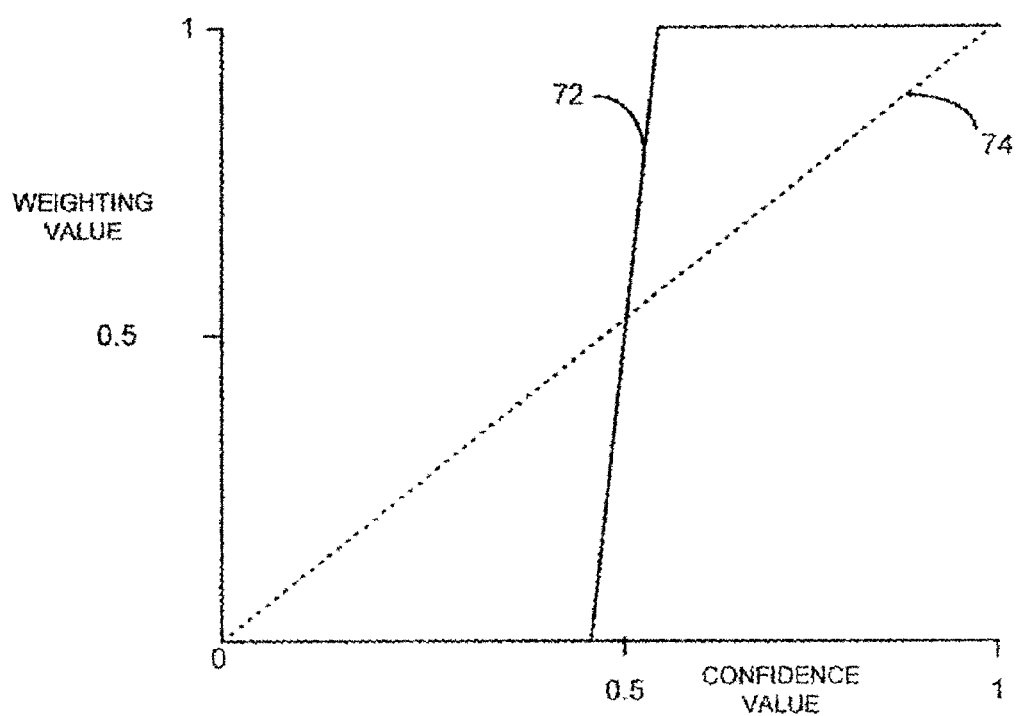
FIG. 16 is a graph illustrating generated blend functions.

FIG. 16 is a graph of a generated blend function illustrating the manner in which the final weighting value W calculated in this way varies in dependence upon the relative confidence score $C_i/(C+C_i)$ for a pixel being processed and the determined difference value D for the pixel.

In the graph as illustrated, solid line 72 indicates a graph for calculating W for weighting values where D is equal to a high value, for example in this embodiment where D ranges between 0 and 765 a value of over 700. As such the graph indicates that where the relative confidence score for a particular source is low a weighting value of zero is selected and for high pixel confidence scores, a weighting factor of one is selected. For intermediate pixel confidence scores an intermediate weighting factor is determined, the weighting factor increasing as the confidence score increases.

The dotted line 74 in FIG. 16 is an illustration of the blend function where the calculated value D for the difference between the image data of the first and second images for a pixel is less than or equal to the blend constant $D_0$. In this case the blend function comprises a function which sets a weighting value equal to the pixel relative confidence score for the pixel.

For intermediate values of D, the blend function varies between the solid line 72 and the dotted line 74 with the thresholds below which or above which a weighting value of zero or one is output reducing and increasing as D decreases. Thus as D decreases the proportion of relative confidence scores for which a weighting value other than zero or one is output increases.

Returning to FIG. 15, after a final weighting value W has been determined the blending module 68 then proceeds to calculate and store blended pixel data (S15-6) for the pixel under consideration. In this embodiment, where the image data comprises colour image data, the calculated blended pixel data is determined for each of the three colour channels by:

$$\text{New pixel Value} = W\begin{bmatrix}\text{pixel value in}\\\text{selected image}\end{bmatrix} + (1-W)*\begin{bmatrix}\text{pixel value in}\\\text{canonical image}\end{bmatrix}$$

The confidence value associated with the blended pixel is then also updated by selecting and storing as a new confidence score for the pixel the greater of the current confidence score associated with the pixel in the canonical image and the confidence score of the pixel in the projection being processed.

The effect of calculating the pixel data for pixels in the high frequency canonical image in this way is to make the pixel data dependent upon both the difference data and the confidence data associated with the processed pixel in the selected high frequency canonical projection. Specifically, where the difference data for a pixel is low (i.e. less than or equal to the blend constant $D_0$) calculated pixel data corresponding to a weighted average proportional to the relative confidence score for the pixel in the associated canonical image is utilized. Where difference data is higher (i.e. greater than the blend constant $D_0$) a pair of threshold values are set based upon the actual value of the difference data. Pixel data is then generated in two different ways depending upon the relative confidence score for the pixel in the associated canonical image. If the relative confidence score is above or below these threshold values either only the original pixel data for the canonical image or the pixel data for the selected high frequency canonical projection is utilized as a composite image data. If the relative confidence score is between the threshold values a weighted average of the original pixel data and pixel data from the selected projection is utilized.

After the generated pixel data has been stored, the blending module 68 then determines (S15-7) whether the pixel currently under consideration is the last of the pixels in the canonical image. If this not the case the non-linear averaging filter then (S15-8) selects the next pixel and repeats the determination of a difference value (S15-4) a blend function (S15-5) and the calculation and storage of pixel data (S15-6) for the next pixel.

If after generated pixel data and a revised confidence score has been stored for a pixel the blending module 68 determines (S15-7) that blended pixel data has been stored for all of the pixels of the high frequency canonical image, the blending module 68 then determines (S15-9) whether the selected high frequency canonical projection and associated confidence image is the last high frequency canonical projection and confidence image to be processed. If this is not the case the next high frequency canonical projection is selected (S15-2) and the canonical high frequency image is updated utilizing this newly selected projection (S15-3–S15), and its associated confidence image.

When the blending module 68 determines that the latest high frequency canonical projection utilized to update a canonical high frequency image is the last of the high frequency canonical projections, the blending module 68 then (S15-10) outputs as a high frequency image for the canonical view 50–55 the high frequency canonical image updated by the final high frequency projection.

The applicants have realized that the undesirable effects of generating composite image data by determining a weighted average of pixels from high frequency image data including data representative of details arise in areas of images where different items of source data differ significantly. Thus for example, where highlights occur in one source image at one point but not at the same point in another source image, averaging across the images results in a loss of contrast for the highlight. If the highlights in the two images occur at different points within the two source images, averaging can also result in the generation of a 'ghost' highlight in another portion of the composite image. Similarly, where different items of source data differ significantly other undesirable effects occur at points of shadow, where an averaging operation tends to cause an image to appear uniformly lit and therefore appear flat.

In contrast to areas of difference between source images, where corresponding points within different source images have a similar appearance, an averaging operation does not degrade apparent image quality. Performing an averaging across such areas of composite image, therefore provides a means by which the relative weight attached to different sources of image data can be varied so that the boundaries between areas of a composite image obtained from different source images can be made less distinct.

Thus in accordance with this embodiment of the present invention weighting factors are selected on the basis of both confidence data and difference data for a pixel so that, relative to weighting factors proportional to confidence data only as occurs in the weighted average filter 66, in the blending module 68, where determined differences between the source images are higher, the weighting given to preferred source data is increased and the corresponding weighting given to less preferred data is decreased.

Thus, where both confidence data and difference data are high, a greater weight is given to a particular source or alternatively only the preferred source data is utilized to generate composite image data. As these areas correspond to areas of detail and highlights or shadow in the high frequency images the detail and contrast in the resultant generated data is maintained.

In areas where there is less difference between different sources of image data, weighting values proportional to confidence data are not modified at all or only slightly so that the boundaries between portions of image data generated from different images are minimised across those areas. Thus in this way composite image data can be obtained which maintains the level of contrast and detail in original high frequency source data, whilst minimising apparent boundaries between portions of composite image generated from different items of source data.

In the above embodiments, a set of images of a subject object is described as being utilized to generate 3D model data and texture render data for generating representations of that subject object. However, texture render data obtained utilizing images of one object could for example be utilized to generate representations of a second object. The mixing of a model obtained for one object and texture derived from a second object could be utilized to establish how the application of texture from different objects varies the appearance of a model.

Specifically, confidence images of a first object from any number of views can be generated in a similar manner as has previously been described. Source images of a different object can then be processed using the confidence images as if the source images had been generated. The processing of the source images in this way would then generate texture data in which the texture in the source images was blended smoothly across the surface of the first object.

Thus for example a number of confidence images could be generated for views of a model. The confidence images of the model viewed from viewpoints to one side of the model might be associated with an image of a first texture for example a wood grain. The remaining confidence images of the model might be associated with a second texture e.g. marble. Processing these two source images with the generated confidence images would generate texture data in which one side of the model appeared having a wood grain texture and the other a marble texture with the two textures being smoothly blended across the surface of the model.

Alternatively, instead of using only a limited number of texture images, images of a different object as viewed from viewpoints for which confidence images were generated could be used. Thus for example, images of a model first object could be generated as has previously been described for a number of viewpoints. Confidence images for a second object could be generated for those corresponding viewpoints and texture data for the second object obtained by processing the images of the first object utilizing the confidence images of the second object.

Although in the above embodiments, confidence images are described that are generated utilizing visibility values calculated from the number of pixels used to represent triangles, other visibility values could be used. For example, a visibility value for a triangle could be set so that for each triangle:

$$\text{visibility value} = \text{abs}[\cos(\Theta) \times \text{closeness}]$$

where $\theta$ is the angle of incidence of a ray from the camera centre defining the selected viewpoint to the triangle centroid of the triangle being texture rendered and closeness is a value inversely proportional to the distance between the camera centre defining the selected viewpoint and the centre of the triangle.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

The invention claimed is:

1. A method of generating a representation of an object indicative of the relative visibility of a plurality of polygons of model data of a model representing an image of the object from a viewpoint at which portions of a surface of the object are visible, said method comprising the steps of:

receiving model data representing the image of the object and defining the plurality of polygons indicative of at least part of the surface of the object for which visibility data is to be determined;

determining for each of the plurality of polygons a visibility value indicative of the ratio of the number of pixels in the image representing visible portions of the polygon from the viewpoint, to a determined greatest number of pixels utilized to represent the polygon from a viewpoint a set distance from the polygon; and generating a representation of the object as viewed from the viewpoint, wherein the visible portions of the surface of the object in the representation defined by the polygons as viewed from the viewpoint are rendered utilizing the respective determined visibility values for the polygons.

2. A method in accordance with claim 1, further comprising the step of associating portions of the surface of the object not visible from the viewpoint with data indicative of low visibility.

3. A method in accordance with claim 1, further comprising the step of determining which visible portions of the object viewed from the viewpoint are adjacent to portions of the surface of the object which are not visible from the viewpoint and associating the determined visible portions of the object adjacent to portions of the surface of the object which are not visible with data representative of a low level of visibility.

4. A method in accordance with claim 3, wherein said determining step that determines which visible portions of the object viewed from the viewpoint are adjacent to portions of the surface of the object which are not visible from the viewpoint comprises the step of: comprises:

determining for the polygons indicative of at least part of the surface of the object as viewed from the viewpoint whether any edges of the polygons are adjacent to polygons oriented away from the viewpoint and associating the edges of polygons visible from the viewpoint, adjacent to polygons orientated away from the viewpoint with data indicative of low visibility.

5. A method in accordance with claim 4, further comprising the step of processing the generated representation of the object viewed from the viewpoint so that the visible portions of the surface of the object are rendered utilizing the respective determined visibility values for the polygons using a blurring function to generate a representation indicative of the relative visibility of visible portions of the surface of the object in which data representative of the visibility of the object varies smoothly across the surface of the object.

6. A method of generating visibility data for the surface of an object defined by received model data representing an image of the surface of the object and defining a plurality of polygons, comprising the steps of:

generating a representation of the object indicative of the relative visibility of the polygons of the model data of a model representing the image of the object from a viewpoint at which portions of the surface of the object are visible in accordance with claim 1;

associating polygons not visible from the viewpoint with data indicative of low visibility;

for polygons completely visible from the viewpoint, utilizing the generated representation to determine visibility data for the surface of the polygons; and for polygons partially visible from the viewpoint, utilizing the generated representation to determine visibility data for the visible portions of the partially visible polygons; and associating the remaining portions of the partially visible polygons with data representative of low visibility.

7. A method of generating data indicative of the reliability of image data of an object from a viewpoint to generate corresponding data from another viewpoint comprising the steps of:

generating visibility data for the surface of the object from the viewpoint in accordance with claim 6; and determining a projection of the visibility data associated with points on the surface of the object as perceived from the another viewpoint.

8. A method of utilizing image data of an object from a plurality of viewpoints to generate image data indicative of a view of the object from another viewpoint comprising the steps of:

receiving image data of the object from the plurality of viewpoints;

generating visibility data for the surface of the object in accordance with claim 9 for each of the plurality of viewpoints;

determining for each of the plurality of viewpoints, representations of the object as viewed from the another viewpoint utilizing the image data of the object from the plurality of viewpoints and the projection of the visibility data for the surface of the object from each viewpoint as perceived from the another viewpoint comprising projected visibility data; and generating image data of the object from the another viewpoint by processing portions of projected image data comprising the projection of image data of the surface of the object from each viewpoint as perceived from the another viewpoint utilizing the projected visibility data.

9. A method in accordance with claim 8, wherein said processing operation comprises the step of selecting portions of the projected image data associated with projected visibility data indicative of high visibility to generate the image data from the another viewpoint.

10. A method in accordance with claim 8 wherein said processing operation comprises the step of determining image data for portions of the image of the object from the another viewpoint by calculating weighted averages of corresponding portions of the projected image data for each viewpoint weighted by the projected visibility data for image data from the plurality of viewpoints.

11. Apparatus for generating a representation of an object indicative of the relative visibility of a plurality of polygons of model data of a model representing an image of the object from a viewpoint at which portions of a surface of the object are visible, said apparatus comprising:

a receiver operable to receive model data representing the image of the object and defining a plurality of polygons indicative of at least part of the surface of the object for which visibility data is to be determined;

a determination unit operable to determine for each polygon defined by the model data received by said receiver, a visibility value indicative of the ratio of the number of pixels in the image representing visible portions of the polygon from the viewpoint, to a determined greatest number of pixels utilized to represent the polygon from a view point a set distance from the polygon; and a view generation unit operable to generate a representation of the object as viewed from the viewpoint, wherein the visible portions of the surface of the object in the representation defined by the model data received by said receiver are rendered utilizing the respective determined visibility values for the polygons determined by said determination unit.

12. An apparatus in accordance with claim 11, further comprising an association unit operable to associate portions of the surface of the object not visible from the viewpoint with data indicative of low visibility.

13. An apparatus in accordance with claim 11, wherein said view generation unit comprises a representation unit operable to generate a representation in which visible portions of the object viewed from the viewpoint that are adjacent to portions of the object the surface of which is not visible from the viewpoint are associated with data representative of a low level of visibility.

14. An apparatus in accordance with claim 13, wherein said representation unit comprises:
an edge determinator operable to determine, for visible polygons of the object as viewed from the viewpoint, whether any edges of the polygons are adjacent to polygons oriented away from the viewpoint and to associate the edges of the visible polygons adjacent to polygons pointed away from the viewpoint with data indicative of low visibility.

15. An apparatus in accordance with claim 12, wherein said view generation unit is operable to generate representations in which data representative of the visibility of the object varies smoothly across the visible surface of the object as viewed from the viewpoint.

16. An apparatus in accordance with claim 15, wherein said view generation unit comprises:
a first image generator operable to generate an initial representation in which polygons visible from the viewpoint are uniformly represented by data indicative of the relative visibility of the polygons; and
a second image generator operable to generate the representation by performing a smoothing operation on an initial image generated by said first image generator.

17. An apparatus for associating points on the surface of an object with visibility data representative of the reliability of image data from a viewpoint at which the points are visible, the apparatus comprising:
a receiver operable to receive model data representing an image of the object and defining a plurality of polygons indicative of at least part of the surface of the object for which the visibility data is to be determined;
a determination unit operable to determine for each polygon defined by the model data received by said receiver, a visibility value indicative of the ratio of the number of pixels in the image representing visible portions of the polygon from the viewpoint, to a determined greatest number of pixels utilized to represent the polygon from a viewpoint normal to the surface of the polygon a set distance from the polygon;
a view generation unit operable to generate a representation of the object as viewed from the viewpoint, wherein the visible portions of the surface of the object in the representation defined by model data received by said receiver are rendered utilizing the respective determined visibility values for the polygons determined by said determination unit;
a first association unit operable to associate polygons not visible from the viewpoint with data indicative of low visibility;
a second association unit operable to associate polygons completely visible from the viewpoint, with visibility data utilizing the representation generated by said view generation unit to determine visibility data for the surface of the polygons; and
a third association unit operable to associate polygons partially visible from the viewpoint with visibility data, utilizing the representation generated by said view generation unit to determine visibility data for the visible portions of the partially visible polygons, and to associate the remaining portions of the partially visible polygons with data representative of low visibility.

18. An apparatus for generating data indicative of the reliability of image data of an object from a viewpoint to generate corresponding data from another viewpoint comprising:
an apparatus for associating points on the surface of the object with visibility data representative of the reliability of image data from a viewpoint at which the points are visible in accordance with claim 17; and
a projector operable to determine a projection of the visibility data associated with points on the surface of the object as perceived from the another viewpoint.

19. An apparatus for utilizing image data of an object from a plurality of viewpoints to generate image data indicative of a view of the object from another viewpoint comprising:
an image receiver operable to receive the image data of the object from the plurality of viewpoints;
an apparatus for generating data indicative of the reliability of the image data of the object from a viewpoint to generate corresponding data from the another viewpoint in accordance with claim 18;
a view generator operable to determine for each of the plurality of viewpoints, projected image data for representations of the object as viewed from the another viewpoint utilizing the image data from the viewpoints received by said image receiver; and
an image generator operable to generate the image data of the object from the another viewpoint by processing portions of the projected image data generated by said view generator utilizing data indicative of the reliability of the image data of the object generated by said apparatus for generating data indicative of reliability.

20. An apparatus in accordance with claim 19, wherein said image generator is operable to process the projected image data by selecting portions of representations of the object associated with reliability data indicative of high reliability of the image data of the object using the generated reliability data to generate the image data of the object from the another viewpoint.

21. An apparatus in accordance with claim 20, wherein said image generator is operable to process the projected image data by determining image data of the object for each portion of the image of the object from the another viewpoint by calculating weighted averages of corresponding portions of the representations of the object as viewed from the another viewpoint and weighted by reliability data generated by said apparatus for generating data indicative of reliability.

22. A recording medium for storing a program for generating within a programmable computer apparatus the apparatus in accordance with any one of claims 11 and 17 or for causing a programmable computer to perform a method in accordance with claim 1.

23. A recording medium in accordance with claim 22, comprising a computer disc.

24. A computer disc in accordance with claim 23, comprising an optical, magneto-optical or magnetic disc.

25. A computer readable program product comprising codes for generating within a programmable computer apparatus the apparatus in accordance with any one of claims 11 and 17 or for causing a programmable computer to perform a method in accordance with claim 1.

26. A computer readable program product according to claim 25 comprising an electrical signal transferred via the internet comprising the codes.

* * * * *

UNITED STATES PATENT AND TRADEMARK OFFICE
CERTIFICATE OF CORRECTION

| | | |
|---|---|---|
| PATENT NO. | : 7,006,089 B2 | |
| APPLICATION NO. | : 10/150840 | |
| DATED | : February 28, 2006 | |
| INVENTOR(S) | : Adam Michael Baumberg | |

It is certified that error appears in the above-identified patent and that said Letters Patent is hereby corrected as shown below:

ON THE TITLE PAGE [75] INVENTOR:

"Berkshire" should read --Bracknell--.

COLUMN 1:

Line 4, "concerns" should read --concerns a--;
Line 6, "concerns" should read --concerns a--;
Line 21, "utilised" should read --utilized--; and
Line 52, "surf ace" should read --surface--.

COLUMN 2:

Line 13, "of" should read --of the present invention--.

COLUMN 3:

Line 24, "utilising" should read --utilizing--.

COLUMN 4:

Line 46, "an" should read --a--; and
Line 67, "optimised" should read --optimized--.

COLUMN 5:

Line 50, "utilised" should read --utilized--; and
Line 65, "utilised" should read --utilized--.

COLUMN 6:

Line 14, "utilising" should read --utilizing--; and
Line 37, "utilised" should read --utilized--.

COLUMN 7:

Line 14, "utilised" should read --utilized--.

UNITED STATES PATENT AND TRADEMARK OFFICE
CERTIFICATE OF CORRECTION

| | | |
|---|---|---|
| PATENT NO. | : 7,006,089 B2 | |
| APPLICATION NO. | : 10/150840 | |
| DATED | : February 28, 2006 | |
| INVENTOR(S) | : Adam Michael Baumberg | |

It is certified that error appears in the above-identified patent and that said Letters Patent is hereby corrected as shown below:

COLUMN 8:

Line 34, "surface" should read --surface of--.

COLUMN 9:

Line 14, "in to" should read --into--.

COLUMN 10:

Line 4, "result" should read --results--.

COLUMN 11:

Line 44, "utilised" should read --utilized--.

COLUMN 16:

Line 4, "utilised" should read --utilized--;
    Line 9, "be" should read --being--;
    Line 13, "utilised" should read --utilized--;
    Line 18, "utilising" should read --utilizing--;
    Line 22, "pixel" should read --pixel.--;
    Line 38, "above described" should read --above-described--; and
    Line 67, "effect" should read --affect--.

COLUMN 17:

Line 24, "effect" should read --affect--.

COLUMN 20:

Line 3, "maps" should read --map--; and
    Line 57, "setting" should read --setting:--.

COLUMN 22:

Line 37, "this" should read --this is--.

UNITED STATES PATENT AND TRADEMARK OFFICE
CERTIFICATE OF CORRECTION

PATENT NO. : 7,006,089 B2
APPLICATION NO. : 10/150840
DATED : February 28, 2006
INVENTOR(S) : Adam Michael Baumberg It is certified that error appears in the above-identified patent and that said Letters Patent is hereby corrected as shown below:

<u>COLUMN 23</u>:

Line 37, "minimised" should read --minimized--; and
    Line 40, "minimising" should read --minimizing--.

<u>COLUMN 24</u>:

Line 38, "be" should read --may be--.
    Line 53, "of," should read --of--.

<u>COLUMN 25</u>:

Line 27, "comprises" (second occurrence) should be deleted.

<u>COLUMN 26</u>:

Line 33, "claim 8" should read --claim 8,--; and
    Line 55, "view point" should read --viewpoint--.

<u>COLUMN 27</u>:

Line 5, "object" should read --object,--; and
    Line 6, "viewpoint" should read --viewpoint,--.

<u>COLUMN 28</u>:

Line 58, "ratus" should read --ratus,--;
    Line 59, "17" should read --17,--; and
    Line 62, "claim 25" should read --claim 25,--.

UNITED STATES PATENT AND TRADEMARK OFFICE
CERTIFICATE OF CORRECTION

| | | |
|---|---|---|
| PATENT NO. | : 7,006,089 B2 | |
| APPLICATION NO. | : 10/150840 | |
| DATED | : February 28, 2006 | |
| INVENTOR(S) | : Adam Michael Baumberg | |

It is certified that error appears in the above-identified patent and that said Letters Patent is hereby corrected as shown below:

SHEET 4 :

Figure 4, "VIEW POINT" (all occurrences) should read --VIEWPOINT--.

Signed and Sealed this

Third Day of April, 2007

JON W. DUDAS
*Director of the United States Patent and Trademark Office*